US012373185B2

(12) United States Patent
Nishioka et al.

(10) Patent No.: US 12,373,185 B2
(45) Date of Patent: Jul. 29, 2025

(54) VERIFICATION DEVICE, VERIFICATION SYSTEM, VERIFICATION METHOD, AND COMPUTER READABLE MEDIUM

(71) Applicant: NEC Corporation, Tokyo (JP)

(72) Inventors: Jun Nishioka, Tokyo (JP); Yoshiaki Sakae, Tokyo (JP); Kazuhiko Isoyama, Tokyo (JP); Yuji Kobayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 318 days.

(21) Appl. No.: 17/907,802

(22) PCT Filed: Mar. 27, 2020

(86) PCT No.: PCT/JP2020/014410
§ 371 (c)(1),
(2) Date: Aug. 29, 2022

(87) PCT Pub. No.: WO2021/192318
PCT Pub. Date: Sep. 30, 2021

(65) Prior Publication Data
US 2023/0101077 A1 Mar. 30, 2023

(51) Int. Cl.
*G06F 8/61* (2018.01)
*G06F 8/77* (2018.01)
*G06F 11/3698* (2025.01)

(52) U.S. Cl.
CPC ............... *G06F 8/61* (2013.01); *G06F 8/77* (2013.01); *G06F 11/3698* (2025.01)

(58) Field of Classification Search
None
See application file for complete search history.

(56) References Cited

U.S. PATENT DOCUMENTS 6,223,345 B1 * 4/2001 Jones ................... G06F 8/60
713/1
9,396,160 B1 * 7/2016 Aithal ............... G06F 11/3684
(Continued)

FOREIGN PATENT DOCUMENTS

JP  2002-091772 A  3/2002
JP  2004-102951 A  4/2004
(Continued)

OTHER PUBLICATIONS

Hof, Benjamin, and Georg Carle. "Software distribution transparency and auditability." arXiv preprint arXiv:1711.07278 (2017). (Year: 2017).*

(Continued)

*Primary Examiner* — Bradley A Teets
*Assistant Examiner* — Joanne G Macasiano

(57) ABSTRACT

An object is to provide a verification device capable of securely verifying a package with less loads on a developer side. A verification device according to the present disclosure includes a receiving means for receiving, between a distribution server that distributes a distribution package for software development and a terminal device, an installation request for the distribution package transmitted from the terminal device, an acquisition means for acquiring, from the distribution server, the distribution package requested by the received installation request, a construction means for constructing a testing environment consistent with a development environment of the terminal device on the basis of the received installation request, a verification means for performing installation verification of the acquired distribution package by using the constructed testing environment, and a transmitting means for transmitting the acquired distribution package to the terminal device on the basis of a verification result of the installation verification.

26 Claims, 29 Drawing Sheets

(56) References Cited

U.S. PATENT DOCUMENTS

| | | | |
|---|---|---|---|
| 10,055,200 B1* | 8/2018 | Russell | G06F 11/3696 |
| 2004/0019781 A1 | 1/2004 | Chari et al. | |
| 2004/0054779 A1* | 3/2004 | Takeshima | H04L 67/563 |
| | | | 709/225 |
| 2005/0234827 A1* | 10/2005 | Rudowsky | G06F 8/60 |
| | | | 705/51 |
| 2009/0170432 A1* | 7/2009 | Lortz | H04W 28/18 |
| | | | 455/41.1 |
| 2011/0010691 A1* | 1/2011 | Lu | G06F 11/3688 |
| | | | 717/124 |
| 2012/0079474 A1* | 3/2012 | Gold | G06F 8/63 |
| | | | 717/173 |
| 2013/0007520 A1* | 1/2013 | Giammarresi | H04L 43/50 |
| | | | 714/E11.178 |
| 2013/0254747 A1* | 9/2013 | Citron | G06F 11/3672 |
| | | | 717/126 |
| 2016/0307129 A1* | 10/2016 | Thomas | G06F 11/3058 |
| 2017/0116411 A1 | 4/2017 | Belyaev | |
| 2018/0018168 A1* | 1/2018 | Jiao | G06F 8/71 |
| 2020/0104243 A1* | 4/2020 | Lee-Smith | G06F 11/3688 |
| 2020/0218641 A1* | 7/2020 | Schwenker | G16H 40/40 |

FOREIGN PATENT DOCUMENTS

| | | |
|---|---|---|
| JP | 2005-535021 A | 11/2005 |
| JP | 2010-039548 A | 2/2010 |
| JP | 2018-533090 A | 11/2018 |

OTHER PUBLICATIONS

Hentonen, Tuomas. "Automated setup of test environments." Satakunta University of Applied Sciences. (2019). (Year: 2019).*

International Search Report for PCT Application No. PCT/JP2020/014410, mailed on Jul. 7, 2020.

Mitsuiwa Yukiko, "Linux power-up course, the 69th GCC Embedded Programming, part 30", Software Design, Aug. 18, 2005, No. 178, pp. 174-181, ISSN 0916-6297.

Fuji Soft Incorporated, Robot business promotion department, "First PALRO" Robocon Magazin, No. 74,Ohmsha, LTD., Mar. 1, 2011, pp. 36-40, ISSN 1883-7832.

* cited by examiner

| USER ID | USER NAME | IP | installed python packages |
|---|---|---|---|
| 1 | UserA | w.x.y.z | python3.6, numpy(1.16), tensorflow(1.14) |
| 2 | UserB | s.x.y.z | python3.7, numpy(1.16), tensorflow(1.14), keras(2.3.0) |

| USER ID | USER NAME | IP | installed python packages | installed nodejs packages |
|---|---|---|---|---|
| 1 | UserA | w.x.y.z | python3.6, numpy(1.16), tensorflow(1.14) | nodejs(8.0), yarn(1.21), express(1.0.0) |
| 2 | UserB | s.x.y.z | python3.7, numpy(1.16), tensorflow(1.14), keras(2.3.0) | nodejs(8.0), yarn(1.21) |

| USER ID | USER NAME | IP | arch/OS | installed system library | installed python packages |
|---|---|---|---|---|---|
| 1 | UserA | w.x.y.z | arm/Ubuntu 18.4 | libzstd.so(hash:xxxxx), libGLX.so.0(hash:yyyyy)… | python3.6, numpy(1.16), tensorflow(1.14) |
| 2 | UserB | s.x.y.z | amd64/windows 10 | phython3.7.dll(hash:aaaaa), _ssl.pyd(hash:bbbbb)… | python3.7, numpy(1.16), tensorflow(1.14), keras(2.3.0) |

| RESULT ID | USER NAME | IP | ENVIRONMENT INFORMATION | PACKAGE TO BE VERIFIED | RESULT |
|---|---|---|---|---|---|
| 101 | UserA | w.x.y.z | numpy(1.16), tensorflow(1.14) | keras(2.3.0) | NORMAL |
| 102 | UserA | w.x.y.z | numpy(1.16), tensorflow(1.14), keras(2.3.0) | scikit-learn | ABNORMAL |

Fig. 10

| ENVIRONMENT ID | USER NAME | IP | ENVIRONMENT INFORMATION |
|---|---|---|---|
| 1001 | User A | w.x.y.z | numpy(1.16), tensorflow(1.14) |
| 1002 | User A | w.x.y.z | numpy(1.16), tensorflow(1.14), keras(2.3.0) |

Fig. 11

```
print("
Collecting package
Downloading https://mirror.server.org/packages/fd/4a/.../packageA-1.0.0.tar.gz
Error: Requested package packageA-1.0.0 shows abnormal behavior.
Possible malicious package contact manager@mirror.server.com with Issue ID #1234 for
further information https://mirror.server.org/anomaly_detail/issue/1234
Validated alternatives:
    packageA-0.9
    packageA-0.8
")
```

Fig. 12

```
C:\Users\guest> pip install packageA
timeout
```

Fig. 14

```
C:¥Users¥guest> pip install packageA
Collecting package
Downloading https://mirror.server.org/packages/fd/4a/···/packageA-1.0.0.tar.gz
Error: Requested package packageA-1.0.0 shows abnormal behavior.
Possible malicious package contact manager@mirror.server.com with Issue ID #1234 for
further information https://mirror.server.org/anomaly_detail/issue/1234
Validated alternatives:
    packageA-0.9
    packageA-0.8
```

(a) lines 1–5
(b) lines 6–8

| RESULT ID | USER NAME | IP | ENVIRONMENT INFORMATION | PACKAGE TO BE VERIFIED | COMPLEXITY | FREQUENCY |
|---|---|---|---|---|---|---|
| 111 | UserA | w.x.y.z | | numpy | 3 | 7 |
| 112 | UserA | w.x.y.z | numpy | pandas | 10 | 5 |
| 113 | UserB | x.y.w.z | | flask | 5 | 3 |

Fig. 20

VERIFICATION DEVICE, VERIFICATION SYSTEM, VERIFICATION METHOD, AND COMPUTER READABLE MEDIUM

This application is a National Stage Entry of PCT/JP2020/014410 filed on Mar. 27, 2020, the contents of all of which are incorporated herein by reference, in their entirety.

TECHNICAL FIELD

The present disclosure relates to a verification device, a verification system, a verification method, and a program.

BACKGROUND ART

In recent system development, developers generally carry out development by using OSS (Open Source Software) published on the Web. For example, for script languages such as Python and Node.js, many packages are published as OSS on the Web. Developers install those packages according to need and use them for development.

However, some OSS can be a program that performs harmful activities for computers of developers. Some are malicious programs whose package names resemble famous ones in order for developers to install them by mistake or that contaminate other normal packages.

In view of the above, techniques to verify whether such OSS is safe or not are known. For example, Patent Literature 1 discloses a system that checks the effect of modification of a data value in a sandbox. The system disclosed in Patent Literature 1 needs to create a sandbox for each case and perform operation verification there in order to perform scenario management.

Patent Literature 2 discloses a device that detects a malicious message and gives a security component an instruction to take measures against this message as anti-DoS measures for CDS.

Further, a system that monitors emails on a mail server and detects a harmful email is known.

CITATION LIST

Patent Literature

PTL1: Published Japanese Translation of PCT International Publication for Patent Application, No. 2018-533090
PTL2: Published Japanese Translation of PCT International Publication for Patent Application, No. 2005-535021

SUMMARY OF INVENTION

Technical Problem

When a developer verifies the operation of a published package, the developer needs to execute a verification program in their own development environment for each installation. Since the developer carries out verification at the timing of installation, heavy loads are placed on a machine, which decreases the convenience of the developer. Considering that a developer usually uses such a package, it is difficult to perform thorough verification when the verification work is done by the developer.

No consideration is given to this issue in the techniques disclosed in Patent Literatures 1 and 2.

The present disclosure has been accomplished to solve the above problems and an object of the present disclosure is thus to provide a verification device, a verification system, a verification method, and a program capable of securely verifying a package with less loads on a developer side.

Solution to Problem

A verification device according to the present disclosure includes a receiving means for receiving, between a distribution server that distributes a distribution package for software development and a terminal device, an installation request for the distribution package transmitted from the terminal device; an acquisition means for acquiring, from the distribution server, the distribution package requested by the received installation request; a construction means for constructing a testing environment consistent with a development environment of the terminal device on the basis of the received installation request; a verification means for performing installation verification of the acquired distribution package by using the constructed testing environment; and a transmitting means for transmitting the acquired distribution package to the terminal device on the basis of a verification result of the installation verification.

A verification system according to the present disclosure includes a distribution server that distributes a distribution package for software development, a terminal device to install the distribution package, and a verification device, wherein the verification device includes a receiving means for receiving, between the distribution server and the terminal device, an installation request for the distribution package transmitted from the terminal device; an acquisition means for acquiring, from the distribution server, the distribution package requested by the received installation request; a construction means for constructing a testing environment consistent with a development environment of the terminal device on the basis of the received installation request; a verification means for performing installation verification of the acquired distribution package by using the constructed testing environment; and a transmitting means for transmitting the acquired distribution package to the terminal device on the basis of a verification result of the installation verification.

A verification method according to the present disclosure includes receiving, between a distribution server that distributes a distribution package for software development and a terminal device, an installation request for the distribution package transmitted from the terminal device; acquiring, from the distribution server, the distribution package requested by the received installation request; constructing a testing environment consistent with a development environment of the terminal device on the basis of the received installation request; performing installation verification of the acquired distribution package by using the constructed testing environment; and transmitting the acquired distribution package to the terminal device on the basis of a verification result of the installation verification.

A program according to the present disclosure causes a computer to execute a verification method including receiving, between a distribution server that distributes a distribution package for software development and a terminal device, an installation request for the distribution package transmitted from the terminal device; acquiring, from the distribution server, the distribution package requested by the received installation request; constructing a testing environment consistent with a development environment of the terminal device on the basis of the received installation request; performing installation verification of the acquired distribution package by using the constructed testing environment; and transmitting the acquired distribution package to the terminal device on the basis of a verification result of the installation verification.

Advantageous Effects of Invention

According to the present disclosure, there are provided a verification device, a verification system, a verification method, and a program capable of securely verifying a package with less loads on a developer side.

BRIEF DESCRIPTION OF DRAWINGS

FIG. 5 is an example of a user list in the verification system according to the present disclosure.

FIG. 6 is an example of a user list in the verification system according to the present disclosure.

FIG. 7 is an example of a user list in the verification system according to the present disclosure.

FIG. 10 is an example of a result list in the verification system according to the present disclosure.

FIG. 11 is an example of an environment list in the verification system according to the present disclosure.

FIG. 12 is an example of a script for error messages in the verification system according to the present disclosure.

FIG. 14 is an example of a display screen in the verification system according to the present disclosure.

FIG. 15 is an example of a display screen in the verification system according to the present disclosure.

FIG. 20 is an example of a result list in the verification system according to the present disclosure.

EXAMPLE EMBODIMENT

With regard to the issue described above in Background Art, the following problem exists.

As described earlier, many packages are currently published as OSS on the Web. Such packages are updated on a daily basis, and the number of those packages is enormous if differences in the version and platform of packages and dependency between packages are taken into account. Therefore, it is complex for developers to list all of verification results of packages to be installed and manage this list with the verification results.

Further, in the case where an unauthorized operation of a package depends on a development environment, it is difficult to perform uniform verification for all developers.

Therefore, it is required to solve the above problem and establish a structure that enables timely verification under the condition where the development environment is updated on a daily basis.

First Example Embodiment

Figure 1:
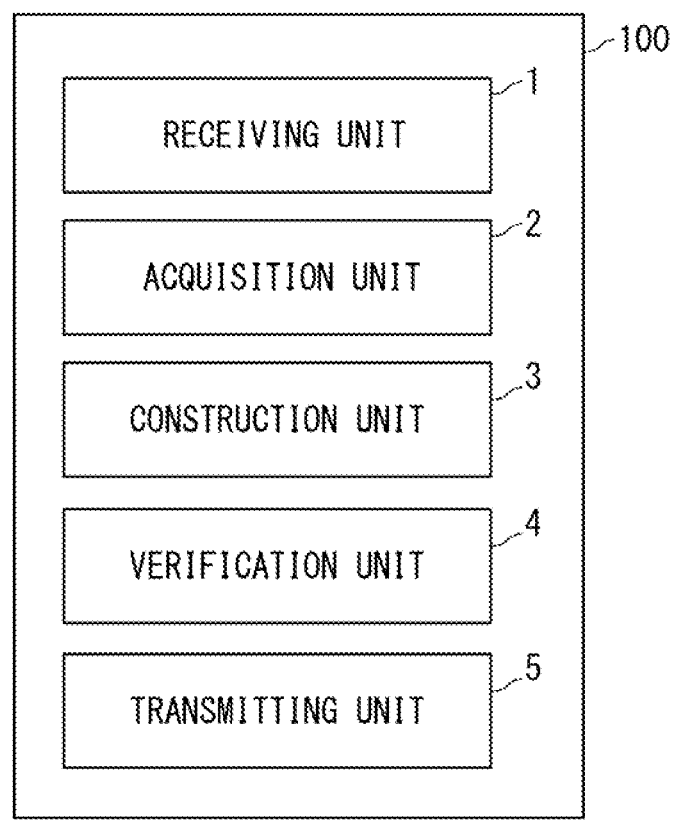
FIG. 1 is a block diagram showing the configuration of a verification device according to the present disclosure.

A verification device 100 according to an example embodiment of the present disclosure is described hereinafter with reference to FIG. 1.

The verification device 100 includes a receiving unit 1, an acquisition unit 2, a construction unit 3, a verification unit 4, and a transmitting unit 5.

The receiving unit 1 receives, between a distribution server that distributes a distribution package for software development and a terminal device, an installation request for the distribution package transmitted from the terminal device.

The acquisition unit 2 acquires, from the distribution server, the distribution package requested by the received installation request.

The construction unit 3 constructs a testing environment consistent with a development environment of the terminal device on the basis of the received installation request.

The verification unit 4 performs installation verification of the acquired distribution package by using the constructed testing environment.

The transmitting unit 5 transmits the acquired distribution package to the terminal device on the basis of a verification result of the installation verification.

As described above, the verification device according to the first example embodiment is capable of securely verifying a package with less loads on a developer side.

Second Example Embodiment

Figure 2:
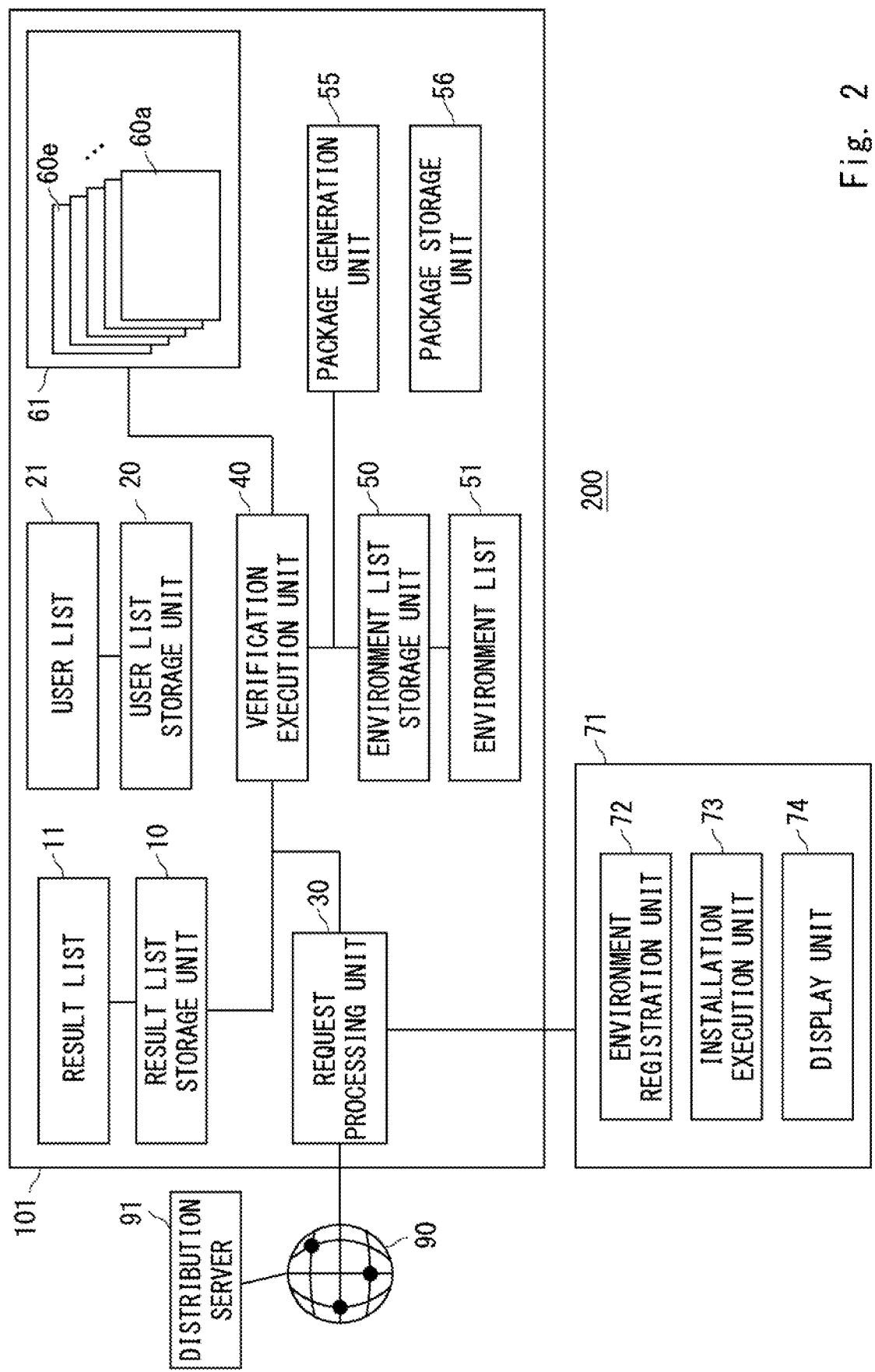
FIG. 2 is a block diagram showing the configuration of a verification system according to the present disclosure.

A verification system 200 that includes a verification device 101 according to an example embodiment of the present disclosure is described hereinafter with reference to FIG. 2. In the following description, a user who makes an installation request for a package is referred to simply as a user, and a package requested by the user is referred to as a requested package.

The verification system 200 includes a distribution server 91, a user terminal 71, and a verification device 101.

The distribution server 91 distributes a package for software development.

The user terminal 71 is a terminal that is used by a user who is a developer.

The verification device 101 relays a package installation result between the distribution server 91 and the user terminal 71 through a network 90. The verification device 101 is a mirror server of the distribution server 91, and it can be implemented by a proxy server, for example.

The network 90 is the Internet, for example.

The user terminal 71 includes an environment registration unit 72, an installation execution unit 73, and a display unit 74.

The environment registration unit 72 registers environment information of the user terminal 71 into a user list 21.

The installation execution unit 73 makes an installation request for a package, and installs and executes a script in the package.

The display unit 74 displays an error message or the like. The display unit 74 is a display, for example.

The verification device 101 includes a user list storage unit 20, a result list storage unit 10, a request processing unit 30, a verification execution unit 40, an environment list storage unit 50, a testing environment storage unit 61, a package storage unit 56, and a package generation unit 55.

In system development, a user simultaneously joins a plurality of projects and carries out development in some cases. In this example embodiment, it is assumed that the verification device 101 is placed for each project.

Figure 3:
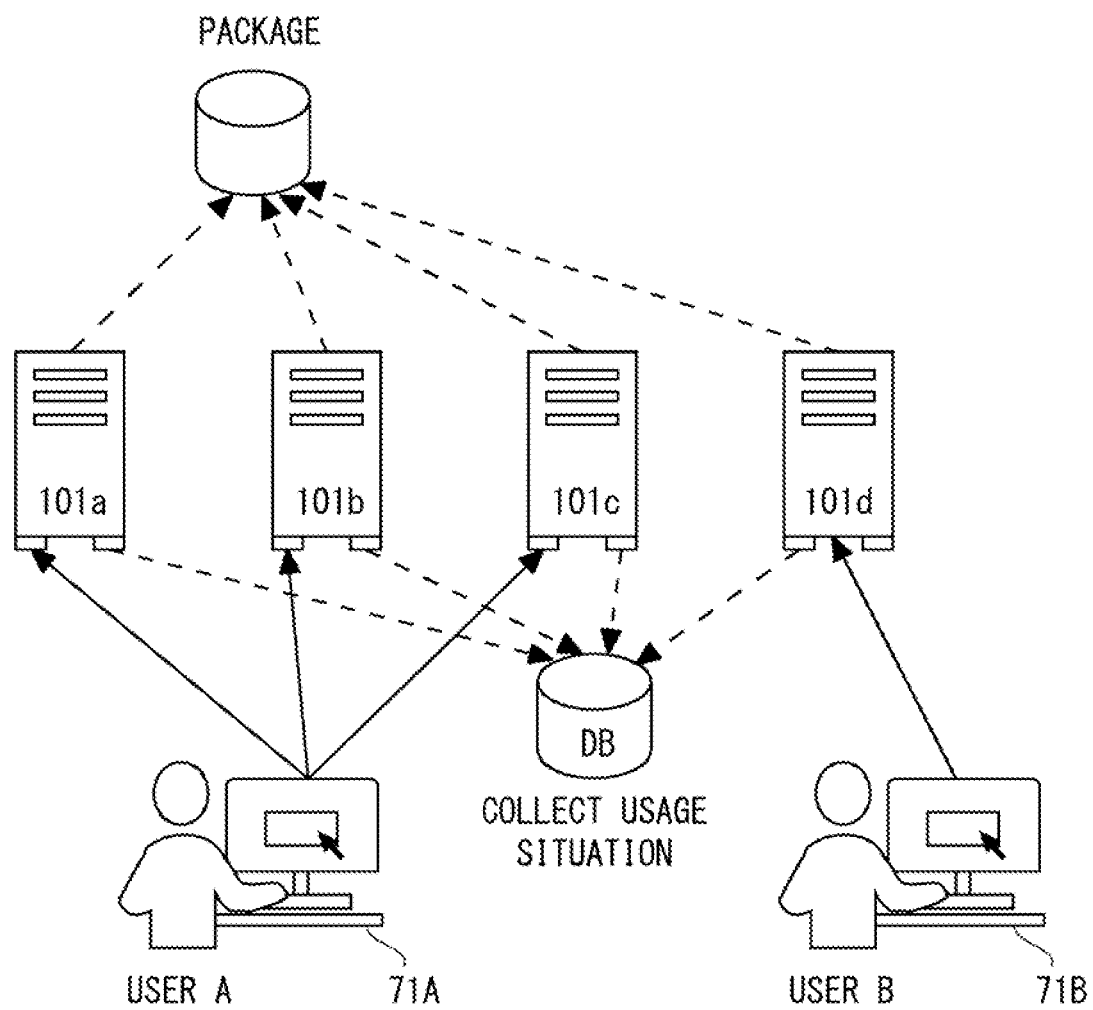
FIG. 3 is an explanatory diagram of the verification system according to the present disclosure.

For example, as shown in FIG. 3, assume the case where a user A joins three projects with one machine. The user A accesses verification devices 101a, 101b and 101c for the respective projects. A user B who joins a single project accesses a verification device 101d only.

Information obtained in each verification device 101 by a process described later can be compiled and stored into a database (DB) connected to the verification device 101 as shown in FIG. 3, for example. The information is thereby used among the verification devices 101, so that efficient operation verification is achieved.

Figure 4:
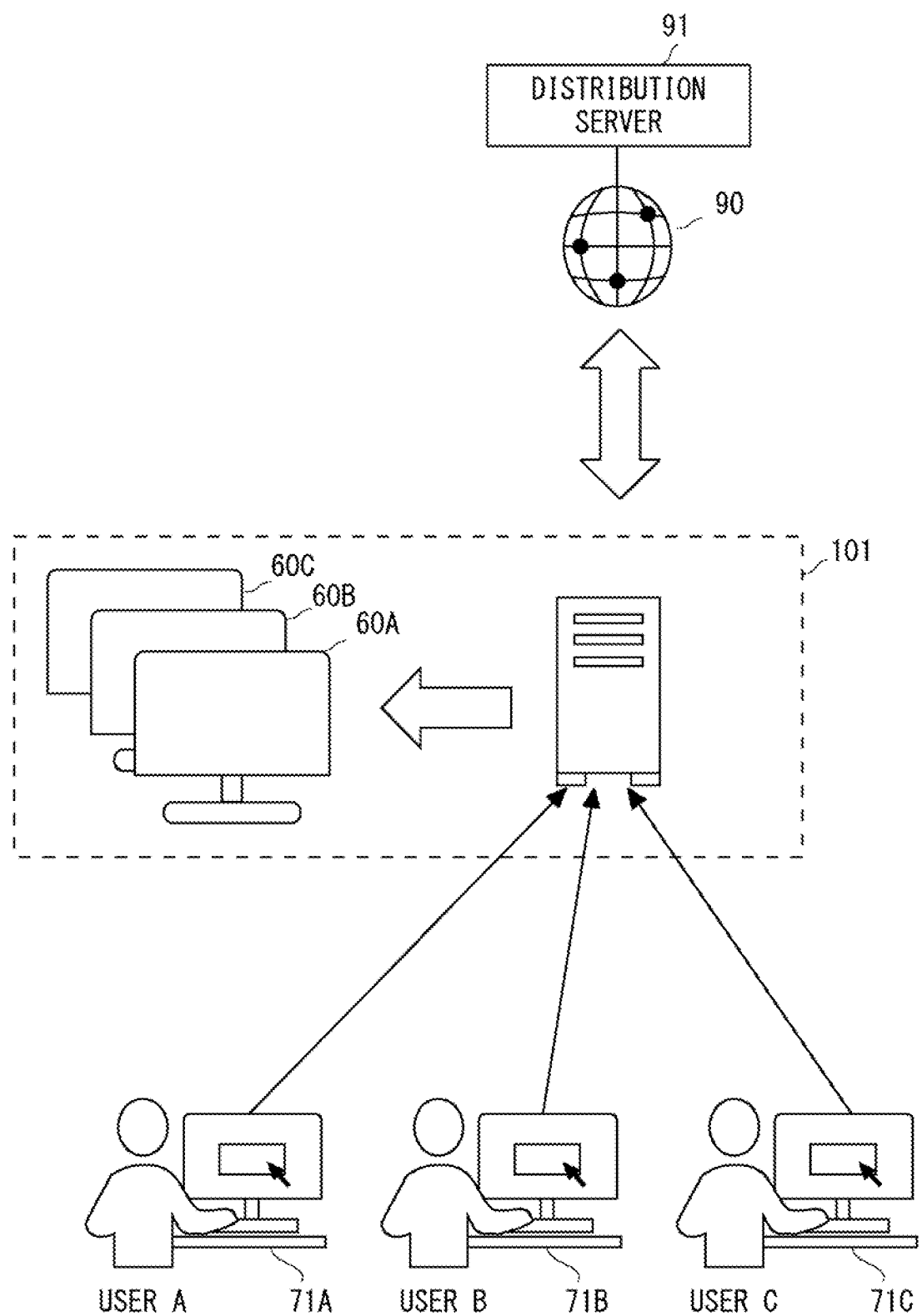
FIG. 4 is an explanatory diagram of the verification system according to the present disclosure.

Since the verification device 101 is placed for each project, a plurality of users may access one verification device 101 as shown in FIG. 4. In this example embodiment, a user is identified by an ID or IP address, and environment information is stored for each user. For example, while the users A, B and C join the same project and therefore access the same verification device 101 in the example shown in FIG. 4, information of each user is identified by a user ID or IP address. Further, in the process described later, a testing environment 60 corresponding to each user's development environment is constructed. For example, a testing environment 60A is constructed for the user A, a testing environment 60B is constructed for the user B, and a testing environment 60C is constructed for the user C.

The user list storage unit 20 acquires environment information of users and stores them as the user list 21. For example, the user list storage unit 20 stores a user name, the user's IP address, and the user's environment information in association with one another.

The environment information is information indicating package installation status in a user's environment information. A package is a set of a plurality of modules available in system development. Examples of a package include numpy, tensorflow, and keras. Environment information may be related to a script or a library, not limited to a package.

Examples of the user list 21 are shown in FIGS. 5 to 7. Environment information of a user that is registered in the user list 21 may be stored for each package installed by the user as shown in FIG. 5, for example. In the case where a user installs a plurality of packages, the plurality of packages may be collectively stored as shown in FIG. 6. Further, as shown in FIG. 7, information about OS (Operating System) or a system library may be further contained. In addition, a project ID, information of hardware such as a CPU may be further contained.

The examples shown in FIGS. 5 to 7 are by way of illustration only, and the user list 21 can be set appropriately depending on the granularity of environment information to be sought. Although version information of each package is shown in the above figures, this information may be omitted if not needed. In the case where a user performs development using a plurality of IP addresses by adding the user's IP addresses to the user list 21, they can be treated as different machines.

As a method for the user list storage unit 20 to acquire user's environment information, a user may register the user's own environment information, or dispensed information when a virtual environment is provided may be stored and maintained, for example. The details are as follows.

In the case where a user registers the user's own environment information, the user registers information about an OS or an installed package from the environment registration unit 72 into the user list storage unit 20. For example, information such as /sbin/ldconfig-p is registered for Linux (registered trademark), and information indicated by PATH, information displayed by a list of applications, dll information under AppData or the like is registered for Windows (registered trademark). In the case of Python, a pyd file or the like may be contained.

Further, a user may register only package information such as Python, Node.js or Ruby, for example. A user can acquire package information from pip freeze command or under site-packages. Alternatively, information may be distinguished only at the OS/CPU Architecture level.

Figure 8:
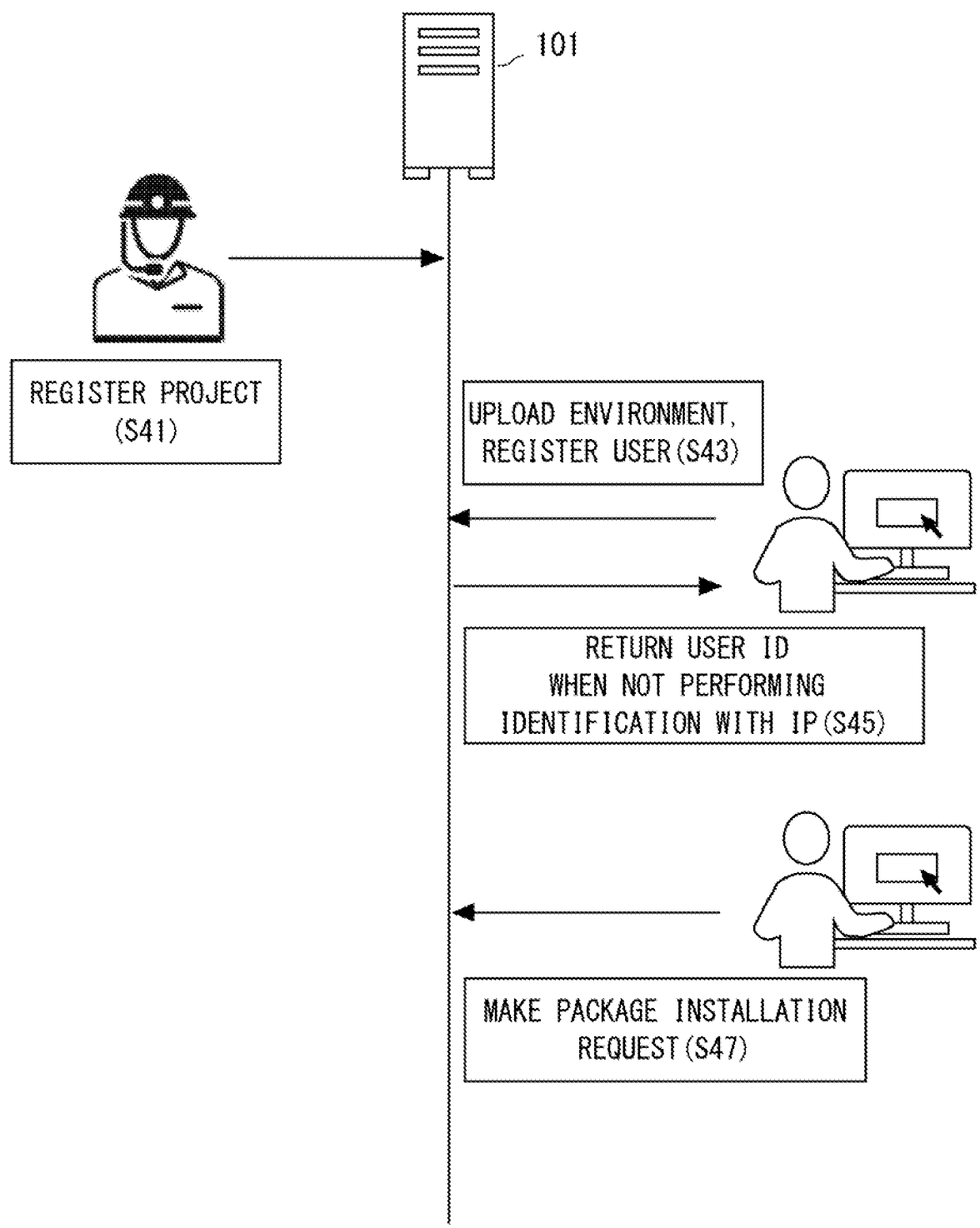
FIG. 8 is an explanatory diagram of the verification system according to the present disclosure.

FIG. 8 shows a process performed by the verification system 200 in the case where a user registers initial environment information. First, a project administrator registers a project into the user list 21 (Step S41). For example, the project administrator registers a project ID or project name by using a terminal for project management (not shown). A user who joins the registered project uploads environment information by the environment registration unit 72 and performs user registration (Step S43).

The user list storage unit 20 stores the user's environment information according to required granularity. In the case of not performing identification with an IP address, the user list storage unit 20 returns the user ID to the user (Step S45). After that, the user makes a package installation request according to need (Step S47). When the user ID is set, the user makes a package installation request containing the user ID. For example, assume that 1234 is returned as the user ID. When the user ID is embedded into a URL, the user makes an installation request such as http://1234.mirror.net/req. When, on the other hand, the user ID is indicated by a parameter rather than URL, the user makes an installation request such as http://mirror.net/req?user=1234.

Figure 9:
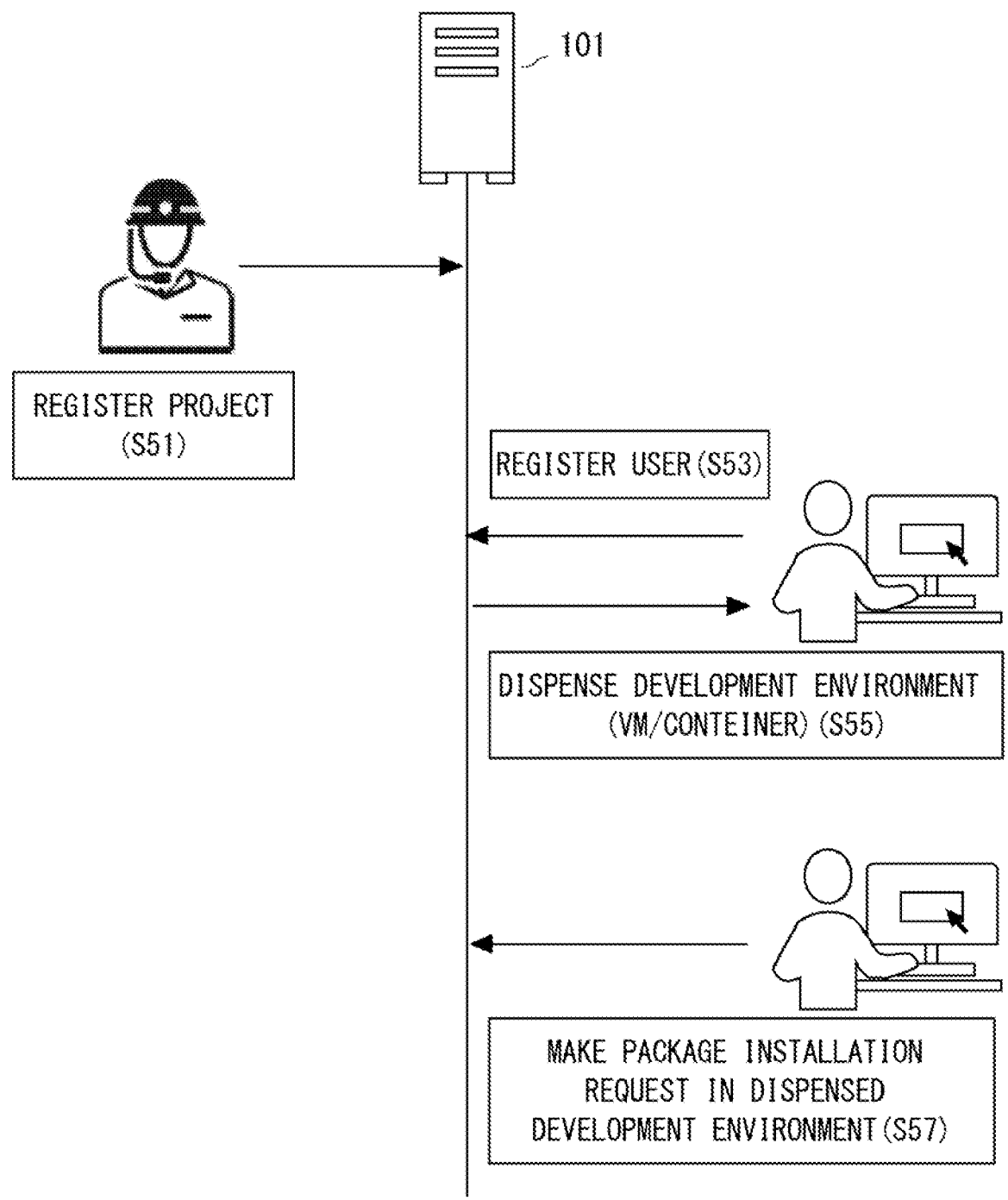
FIG. 9 is an explanatory diagram of the verification system according to the present disclosure.

On the other hand, in the case where an initial environment is provided to a user by a virtual machine, the user list storage unit 20 stores dispensed information, so that the user's initial environment information is recognizable. FIG. 9 shows a process performed by the verification system 200 in this case.

In the same manner as the above example, a project administrator first registers a project into the user list 21 (Step S51). A user who joins the project performs user registration (Step S53). The verification device 101 dispenses a development environment to the user (Step S55). The user list storage unit 20 stores this dispensed information into the user list 21 according to required granularity. The user then makes a package installation request in the dispensed development environment (Step S57).

The user's environment information stored in the user list 21 by the above process is updated by the verification execution unit 40 at the timing when the OS or system package is updated.

The result list storage unit 10 associates the user's environment information with an operation verification result of a package installed in this development environment and stores them as a result list 11.

FIG. 10 shows an example of the result list 11. In the result list 11, a user name, an IP address, environment information, a package to be verified, and a verification result, for example, are associated and stored.

The request processing unit 30 acquires a package distributed by the distribution server 91 and stores it into the package storage unit 56. Further, the request processing unit 30 receives a package installation request from a user. When installation of the package requested by the user is permitted by the verification execution unit 40, the request processing unit 30 delivers the requested package to the user. Note that the request processing unit 30 corresponds to the receiving unit 1, the acquisition unit 2 and the transmitting unit 5 in the first example embodiment.

The verification execution unit 40 determines whether or not to allow a user to install a requested package. To be specific, the verification execution unit 40 acquires the user's environment information from the user list 21 and checks the information of the result list 11. When the operation of the requested package in the user's environment information is already verified in the result list 11, the verification execution unit 40 determines whether to allow the user to install the requested package on the basis of this verification result. Therefore, in the case where a verification result already exists, the verification execution unit 40 does not additionally perform operation verification. Note that the verification execution unit 40 corresponds to the construction unit 3 and the verification unit 4 in the first example embodiment. The verification execution unit 40 may be placed outside the verification device 101.

When, on the other hand, the operation of the requested package in the user's environment information is not yet verified in the result list 11, the verification execution unit 40 constructs a new testing environment 60. In the constructed environment, the verification execution unit 40 installs the requested package acquired from the distribution server 91 and verifies its operation by an installation verification tool. The installation verification tool is a system that learns the behavior of the package when installed and detects an abnormality, for example.

The verification execution unit 40 is capable of preparing the testing environment 60 on a project-by-project basis and on a PC-by-PC basis. The verification execution unit 40 updates the testing environment 60 each time a package is installed into the testing environment 60.

The verification execution unit 40 passes the requested package to the user when it permits installation, and passes a package for error display generated by the package generation unit 55 to the user when it does not permit installation.

Further, the verification execution unit 40 discards the testing environment 60 at specified timing.

As described above, when a verification result already exists for a requested package, the verification execution unit 40 uses this verification result. In system development, there is a tendency in a package to be installed depending on the type of a user who is a developer. For example, a package sought by a user is common depending on the development area, such as flask for web development and tensorflow for deep learning, for example. Thus, there is a case where a user B who is the same type as a user A makes an installation request for a package for which an installation request has been made by the user A. In such a case, a verification result of the user A is used, and verification can be omitted for the user B.

The environment list storage unit 50 creates a list of the constructed testing environments 60 and stores it as an environment list 51.

FIG. 11 shows an example of the environment list 51. In the environment list 51, an environment ID, a user name, an IP address of the user, and environment information of the user are stored in association with one another, for example.

The testing environment storage unit 61 stores the testing environments 60. As an example. FIG. 2 shows five testing environments 60 from 60(*a*) to 60(*e*). Each of the testing environments 60 is a virtual machine (VM) that can operate simultaneously or in parallel as if each of them uses a dedicated physical computer environment, for example, in the verification device 101. The testing environment 60 may be a container or a virtual environment that can be shared with other users on the web, for example.

The package storage unit 56 stores a package acquired from the distribution server 91.

The package generation unit 55 generates a package for error display to be delivered to a user when operation verification of a requested package is abnormal. A script as shown in FIG. 12, for example, is written in the package for error display. By executing this script, an error message is displayed on the display unit 74. Information displayed on the display unit 74 is described hereinafter in detail in comparison with normally displayed information.

A process performed by the package generation unit 55 is described hereinafter with reference to the flowcharts shown in FIGS. 16 to 18.

Figure 13:
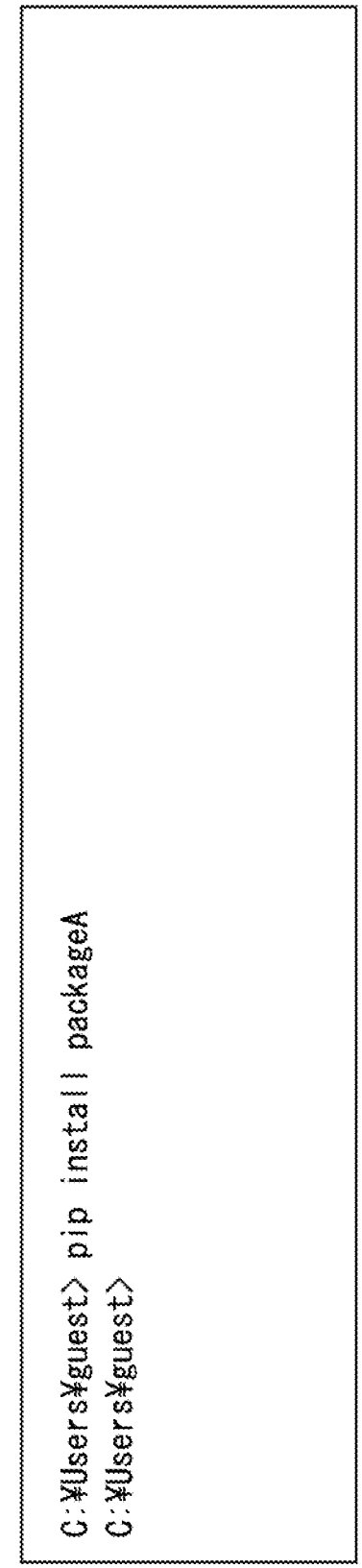
FIG. 13 is an example of a display screen in the verification system according to the present disclosure.
Figure 16:
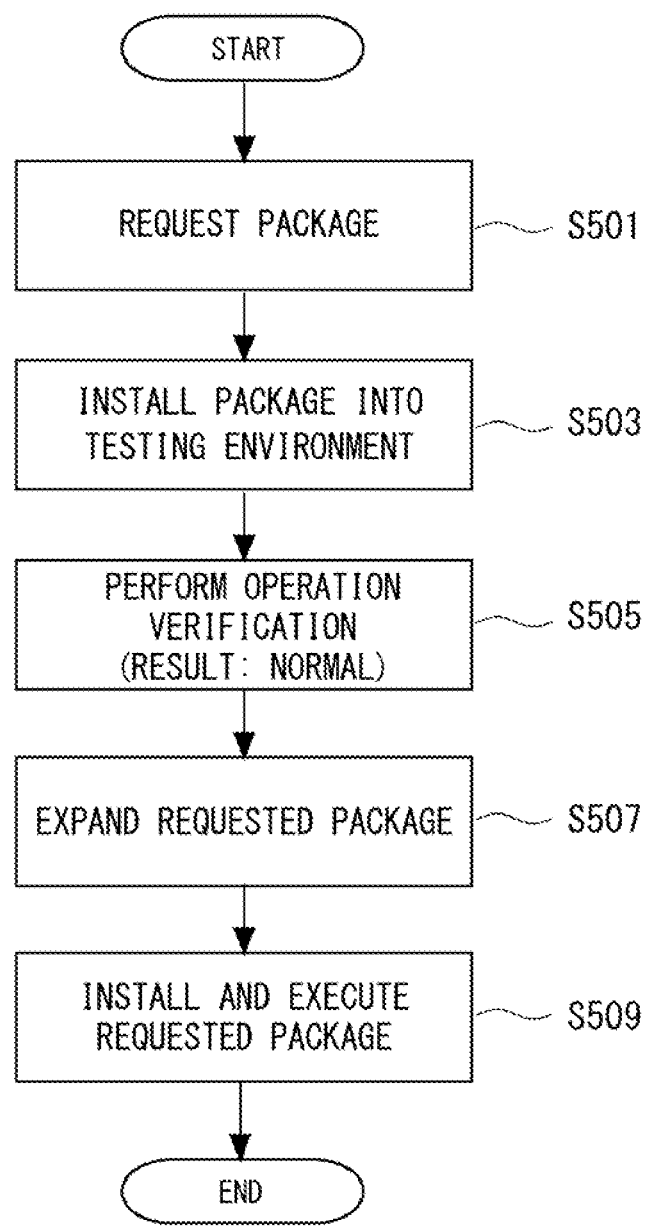
FIG. 16 is a flowchart showing a process in the verification system according to the present disclosure.

First, FIG. 16 is a flowchart showing the overview of a process performed by the verification system 200 when a verification result is normal. When a user requests a package (Step S501), the verification execution unit 40 installs the requested package into the testing environment 60 (Step S503), and performs operation verification (Step S505). Since a verification result is normal, the request processing unit 30 transmits the requested package to the installation execution unit 73. The installation execution unit 73 receives and expands the requested package (Step S507). The installation execution unit 73 installs and executes the script in the requested package (Step S509). At this time, information as shown in FIG. 13 is displayed on the display unit 74.

Figure 17:
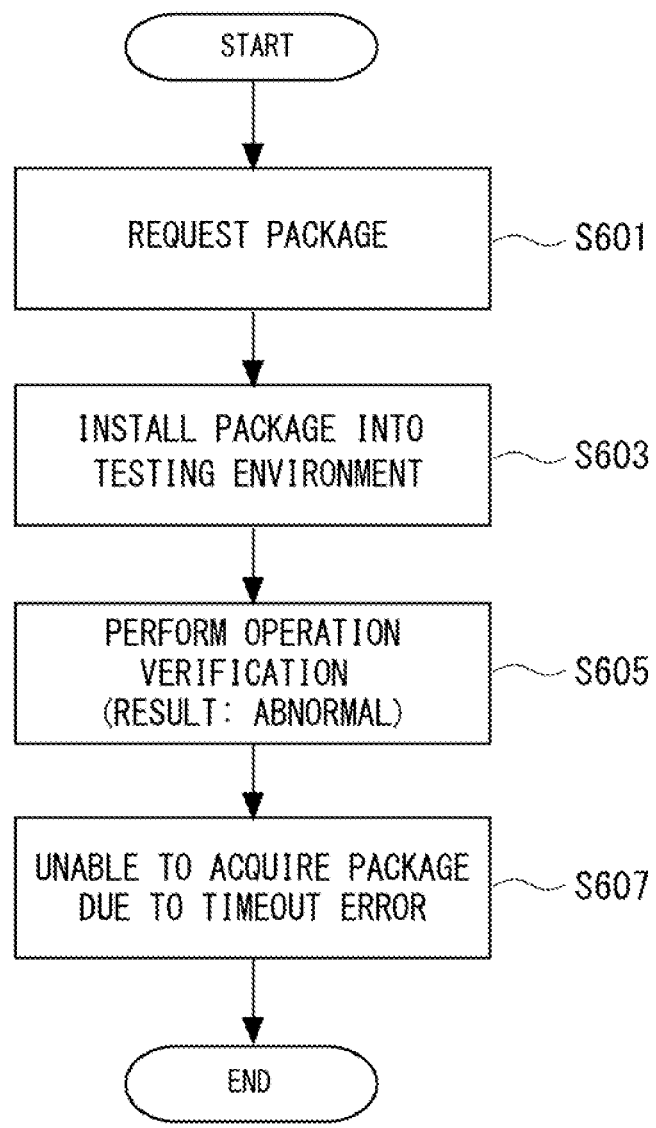
FIG. 17 is a flowchart showing a process in the verification system according to the present disclosure.
Figure 18:
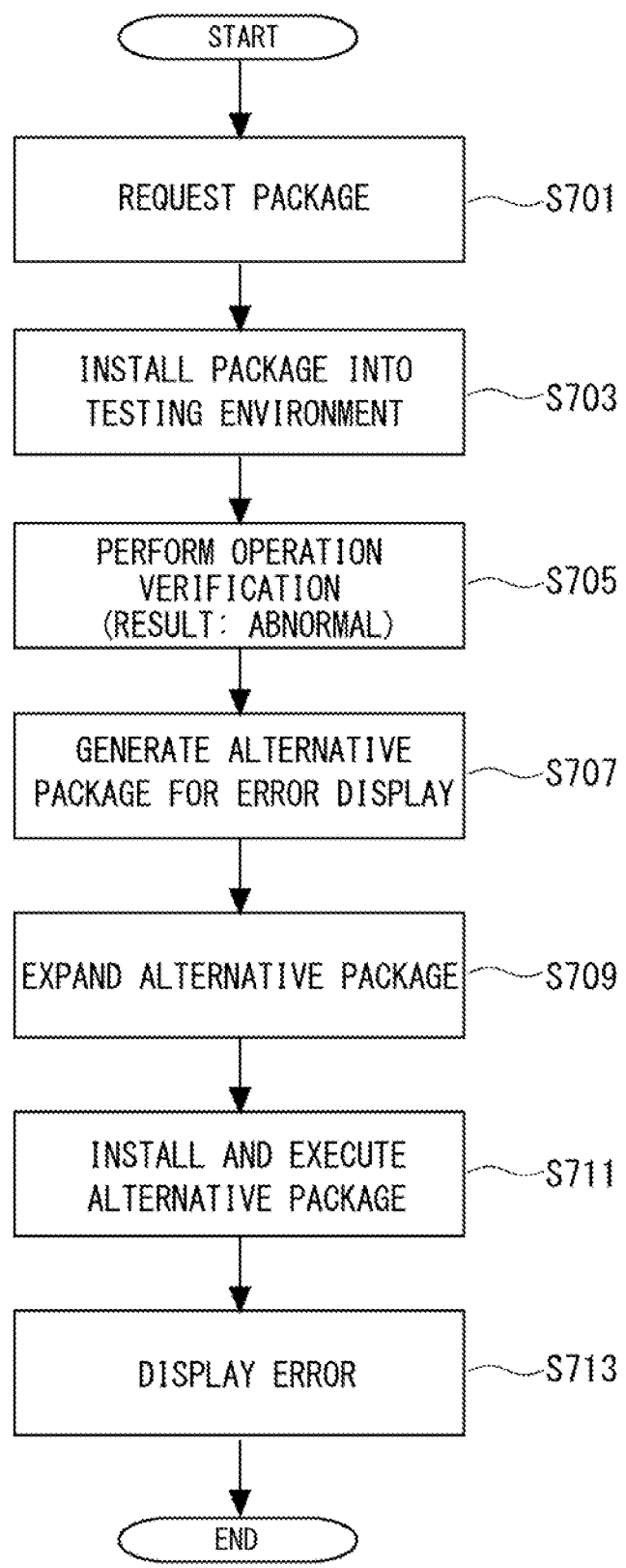
FIG. 18 is a flowchart showing a process in the verification system according to the present disclosure.

On the other hand, FIGS. 17 and 18 are flowcharts showing the overview of a process performed by the verification system 200 when a verification result is abnormal. FIG. 17 shows a process in the case where information about a verification result is not sent to a user, and FIG. 18 shows a process in the case where it is sent to a user.

A process of the verification system 200 in FIG. 17 is described hereinafter. When a user requests a package to the request processing unit 30 (Step S601), the verification execution unit 40 installs the requested package into the testing environment 60 (Step S603), and performs operation verification (Step S605). Since a verification result is abnormal, the verification execution unit 40 does not allow the user to install the requested package. The process ends due to a timeout error, and the user cannot install the requested package (Step S607). At this time, as shown in FIG. 14, information indicating timeout is displayed on the display unit 74.

A process of the verification system 200 in FIG. 18 is described hereinafter. When a user requests a package to the request processing unit 30 (Step S701), the verification execution unit 40 installs the requested package into the testing environment 60 (Step S703), and performs operation verification (Step S705). Since a verification result is abnormal, the verification execution unit 40 does not allow the user to install the requested package.

The package generation unit 55 generates an alternative package that displays error details instead of the requested package (Step S707). The verification execution unit 40 transmits the alternative package to the user terminal 71. The installation execution unit 73 receives and expands the alternative package (Step S709). The installation execution unit 73 installs and executes the script in the alternative package (Step S711). At this time, the error message as shown in FIG. 15 is displayed on the display unit 74 (Step S713). Note that, when a verification result of the requested package in the user's environment already exists in the result list 11, whereas processing of Steps S703 and S705 is not performed, processing of Step S707 and the subsequent steps remains the same.

In the error message displayed by the alternative package, a description that a verification result is abnormal and a URL to check the details of the abnormality are shown as shown in FIG. 15(*a*), for example. This allows the user to be aware of the fact that installation of the requested package is not permitted and the reason that it is not permitted.

Further, in the case where a requested package of the same name as and a different version from a package whose installation is requested by a user is installable, this can be notified to the user as shown in FIG. 15(*b*). Thus, even when the originally requested package is not installable, the user can possibly install necessary functions by installing the package of a different version.

As described above, by delivering an alternative package to a user and giving a notification when an installation request is not accepted, an error message that is useful for the user is delivered without need for an additional structure.

Figure 19:
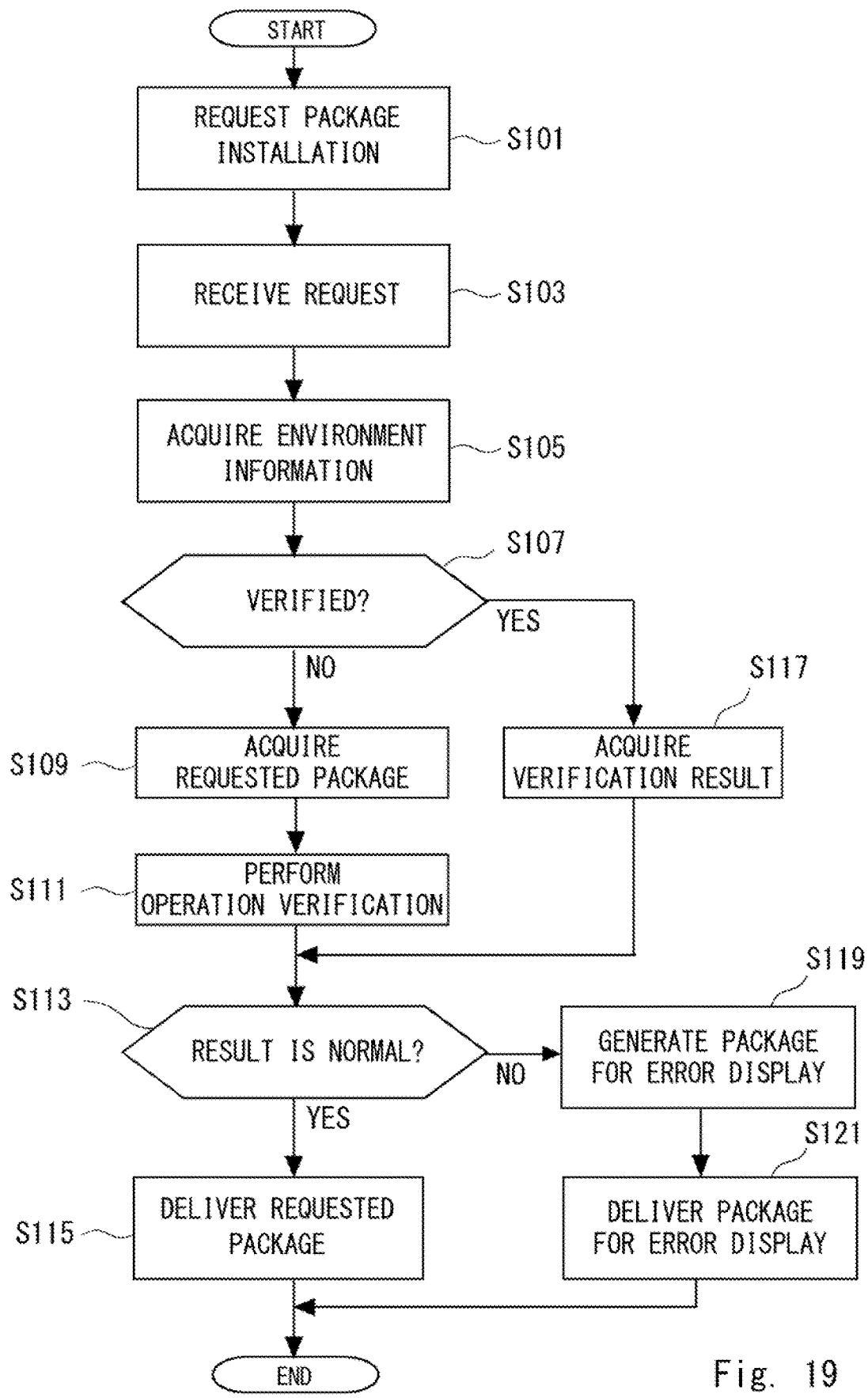
FIG. 19 is a flowchart showing a process in the verification system according to the present disclosure.

A process performed by the verification system 200 is described hereinafter with reference to the flowchart of FIG. 19.

First, a user makes a package installation request to the request processing unit 30 by using the installation execution unit 73 (Step S101). The request processing unit 30 receives the user's installation request (Step S103).

The verification execution unit 40 acquires the user's environment information from the user list 21 on the basis of the user ID or IP address (Step S105). When the user's environment information is not registered in the user list 21, the verification execution unit 40 assigns a base environment common to other users as the user's environment information.

The verification execution unit 40 checks whether the verification of the requested package is done in the user's environment by using the result list 11 (Step S107). For example, assume that numpy (1.16) and tensorflow (1.14) are installed in the user's environment, and the user requests installation of keras (2.3.0) as in the example shown in FIG. 10. In this example, the above-described verification is completed in the result ID 101.

When it is confirmed that the verification of the requested package in the user's environment is done (Yes in Step S107), the verification execution unit 40 acquires this verification result (Step S117). The verification execution unit 40 checks whether the acquired verification result is normal or abnormal (Step S113). When the verification result is normal (Yes in Step S113), the request processing unit 30 delivers the requested package to the user (Step S115).

When, on the other hand, the verification result is abnormal (No in Step S113), the package generation unit 55 generates a package for error display (Step S119). The verification execution unit 40 delivers the package for error display to the user (Step S121).

When it is not confirmed that the verification of the package is done (No in Step S107), the request processing unit 30 makes a package installation request to the distribution server 91 through the network 90 and acquires the package (Step S109). The verification execution unit 40 constructs the testing environment 60 on the basis of the user's environment information. The verification execution unit 40 performs operation verification of the requested package in the constructed testing environment 60 (Step S111).

The verification execution unit 40 checks whether the acquired verification result is normal or abnormal (Step S113). The following processing is the same as described above and thus omitted.

In this manner, since the verification device 101 relays the requested package to the user after confirming that it is not harmful, installation of a package that is harmful to the user's environment is prevented.

Further, although a proxy and the like is usually required in the user's environment, this interferes with operation verification of a package. Since the verification device 101 is capable of performing operation verification in the environment without them, the reliability of a verification result or the like is enhanced.

As described above, according to the verification system 200 of this example embodiment, the verification device 101 relays a package installation request between the distribution server 91 and the user terminal 71, and it is therefore capable of securely verifying a package with less loads on a user side.

Further, according to the verification method of this example embodiment, the method includes receiving, between a distribution server that distributes a distribution package for software development and a terminal device, an installation request for the distribution package transmitted from the terminal device, acquiring, from the distribution server, the distribution package requested by the received installation request, constructing a testing environment consistent with a development environment of the terminal device on the basis of the received installation request, performing installation verification of the acquired distribution package by using the constructed testing environment, and transmitting the acquired distribution package to the terminal device on the basis of a verification result of the installation verification. It is therefore capable of securely verifying a package with less loads on a developer side.

Third Example Embodiment

In the case of constructing the testing environment 60 from the beginning each time an installation request is made from a user, it takes a longer time to construct the testing environment 60 as the number of already installed packages is larger. Thus, in this example embodiment, a method for reducing the time to construct the testing environment 60 is described. Note that the configuration of the verification system 200 according to this example embodiment is the same as that of the second example embodiment and thus not repeatedly described below.

In this example embodiment, package operation verification results are stored in a tree structure. By storing them in a tree structure, verification results and the testing environments 60 are visually recognizable. This has an advantage that makes management easier for administrators.

First, a tree structure in this example embodiment is described hereinafter.

As already described with reference to FIG. 10, a verification result of a package is stored as the result list 11 together with environment information used for verification. As shown in FIG. 20, for example, the result list 11 may be a list showing the complexity of a verified package and the number of times (frequency) a verification result is used.

Figure 21:
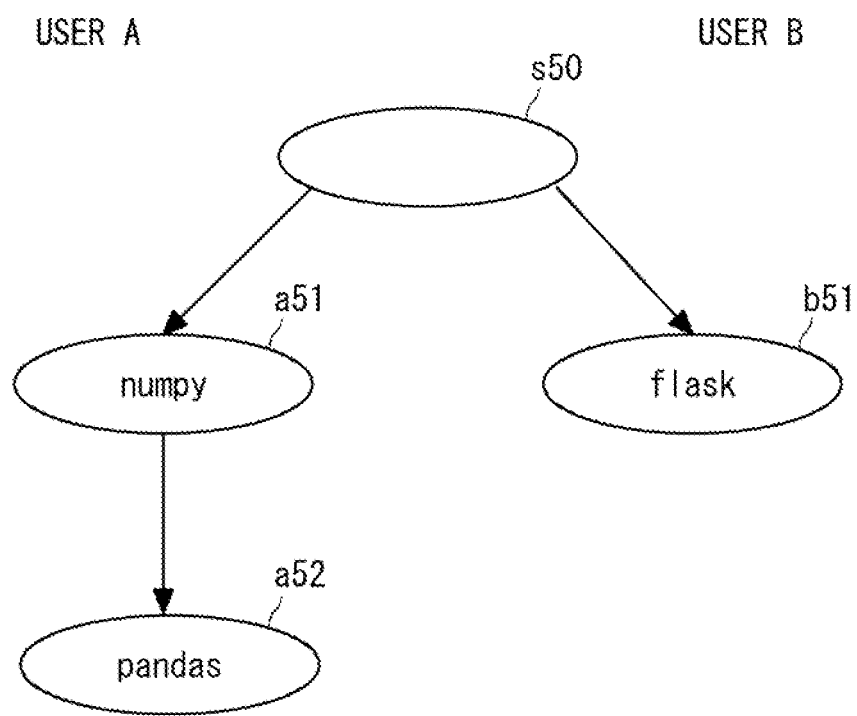
FIG. 21 is a diagram showing a tree of verification results etc. in the verification system according to the present disclosure.

FIG. 21 shows, in a tree structure, the result list 11 shown in FIG. 20. As shown in FIG. 21, installed packages are represented as nodes in a tree. Further, packages are recorded in order of installation. Thus, nodes are connected each time a package is installed and thereby the tree grows.

Since a node is not added when a package verification result is abnormal, each node means that operation verification is done for this package and its result is normal. Further, the tree indicates the testing environment 60 up to this point.

A process performed by the verification system 200 is described hereinafter with reference to the tree diagram shown in FIG. 21.

First, a user A is in the initial state where no package is installed (s50). When the user A makes an installation request for numpy (a51), the verification execution unit 40 checks an operation verification result of numpy in the initial state in the result list 11 (s50). When there is no verification result, the request processing unit 30 acquires numpy, which is a requested package, from the distribution server 91 and stores it into the package storage unit 56.

The verification execution unit 40 constructs the testing environment 60 of the initial state (s50) of the user A, and installs numpy stored in the package storage unit 56 and performs operation verification in the testing environment 60. When a verification result is normal, the request processing unit 30 passes the numpy package to the user A. The user A installs numpy (a51). The verification execution unit 40 maintains the constructed testing environment 60 of numpy.

Assume then that the user A makes an installation request for pandas. The verification execution unit 40 does not perform verification of numpy (a51), which is already verified. The verification execution unit 40 performs operation verification of pandas by using the latest testing environment 60, which is the testing environment 60 in which numpy is installed. When a verification result of pandas is normal, the user A installs pandas (a52). When, on the other hand, a verification result of pandas is abnormal, the verification execution unit 40 discards the constructed testing environment 60, and delivers a package for error display to the user A.

In the case where a user B installs flask (b51) from the initial state (s50), a verification result of the user A is not usable since a requested package is different. Therefore, it is a different node in a tree, and verification needs to be performed also for flask (b51) in the same manner as the case of numpy (a51).

Figure 22:
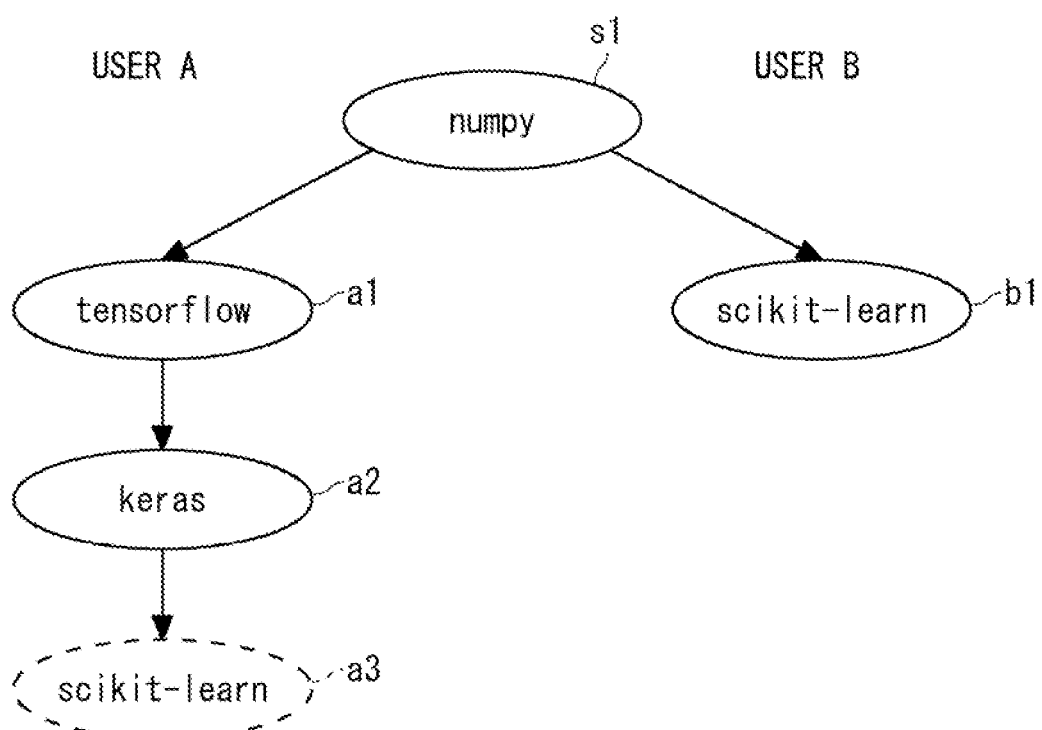
FIG. 22 is a diagram showing a tree of verification results etc. in the verification system according to the present disclosure.

The case where another user installs the same package in the tree shown in FIG. 22 is described hereinafter.

In FIG. 22, assume that the user A has installed numpy, tensorflow, and keras in this order (s1, a1, a2). The verification execution unit 40 performs verification in each step, and maintains the testing environment 60 in each step.

Next, when the user B makes an installation request for numpy and scikit-learn in this order (s1, b1), since numpy is already verified by the user A, the verification execution unit 40 allows installation of numpy without verifying numpy. The verification execution unit 40 carries out verification of scikit-learn by using the testing environment 60 in which numpy is already verified (b1).

Assume then that the user A further makes an installation request for scikit-learn (a3). Although scikit-learn is verified by the user B (b1), since the testing environment 60 is different, the verification execution unit 40 carries out verification of scikit-learn again by using the testing environment 60 of a2. In this manner, when the testing environment 60 is different, it is managed as a different node even if a requested package is the same.

As described above, according to the verification system 200 of this example embodiment, verification results are shown in a tree structure, which enables efficient management of the verification results and the testing environments 60.

Fourth Example Embodiment

As described earlier, the number of published packages is enormous. If only verification results where the environment information is completely the same are used, and another verification is carried out when the environment information is different only slightly, an increase in the testing environment 60 causes a strain on machine resources.

As a countermeasure to this problem, a method of efficiently using verification results is described in this example embodiment. Note that the configuration of the verification system 200 according to this example embodiment is the same as that of the second example embodiment and thus not repeatedly described below.

A process performed by the verification system 200 in this example embodiment by using the tree of FIG. 22 described in the third example embodiment is described hereinafter. It is assumed that the users A and B have installed packages s1, a1, a2 and b1 as shown in the tree, and the user A makes an installation request for scikit-learn (a3).

Then, the verification execution unit 40 uses a verification result of scikit-learn within a specified number of hops in the tree. To be specific, the verification execution unit 40 sets a threshold for the number of hops within which use of verification results is allowed, and if there is a verification result of scikit-learn within the threshold, the verification execution unit 40 uses it, and otherwise newly performs verification.

Assume, for example, that the threshold is set to 4. In FIG. 22, the node (b1) of scikit-learn of the user B exists within 4 hops from the node (a3) for which installation is requested by the user A. Thus, the verification execution unit 40 uses the result of b1 and permits the installation request of scikit-learn (a3) from the user A without performing new verification.

In the above case, although the verification execution unit 40 does not perform verification for the installation request from the user A, it updates the testing environment 60. Further, although the threshold is set to 4 as the number of hops in the above example, the threshold is not limited thereto and can be set to any value. Setting a large threshold allows reducing the number of verifications to be performed, and setting a small threshold allows using only verification results in a closer development environment.

Further, the threshold may be set in consideration of the complexity of a package located in between. The complexity of a package is calculated from the related process, the number of files, the number of directories and the like at the time of installation, for example, and stored into the result list 11.

For example, in the above example, the complexity of tensorflow (a1) and keras (a2) located between numpy (s1) and scikit-learn (a3) is taken into consideration. For example, when calculating the number of hops between nodes, one-tenth of the complexity of a package is added in addition to the distance between nodes. In the example shown in FIG. 20, since the complexity of numpy is 3, a value obtained by adding 0.3 to the number of hops is used for comparison with the threshold when numpy is located at the midpoint of the tree, for example.

As described above, according to the verification system 200 of this example embodiment, verification is efficiently performed by using verification results within a predetermined range in a tree of verification results or the like.

Fifth Example Embodiment

This example embodiment is described hereinafter with reference to the tree diagrams shown in FIGS. 23 and 24. In this example embodiment, enhancement of the efficiency of verification when only the order of installation of packages is different is described. Note that the configuration of the verification system 200 according to this example embodiment is the same as that of the second example embodiment and thus not repeatedly described below.

Figure 23:
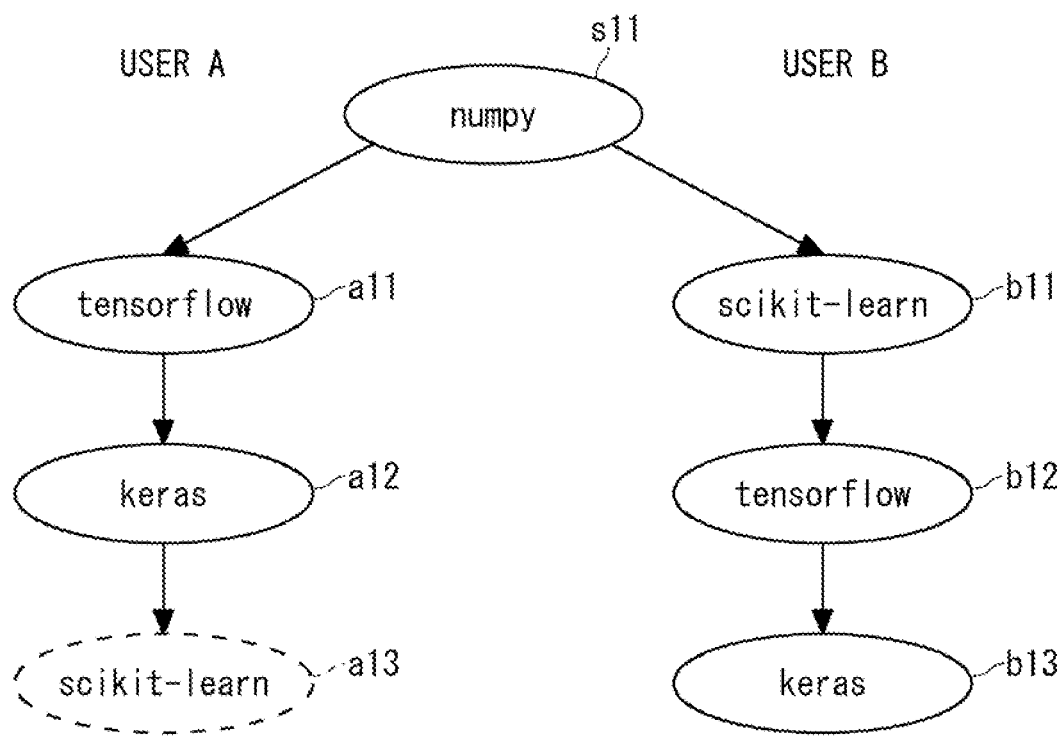
FIG. 23 is a diagram showing a tree of verification results etc. in the verification system according to the present disclosure.
Figure 24:
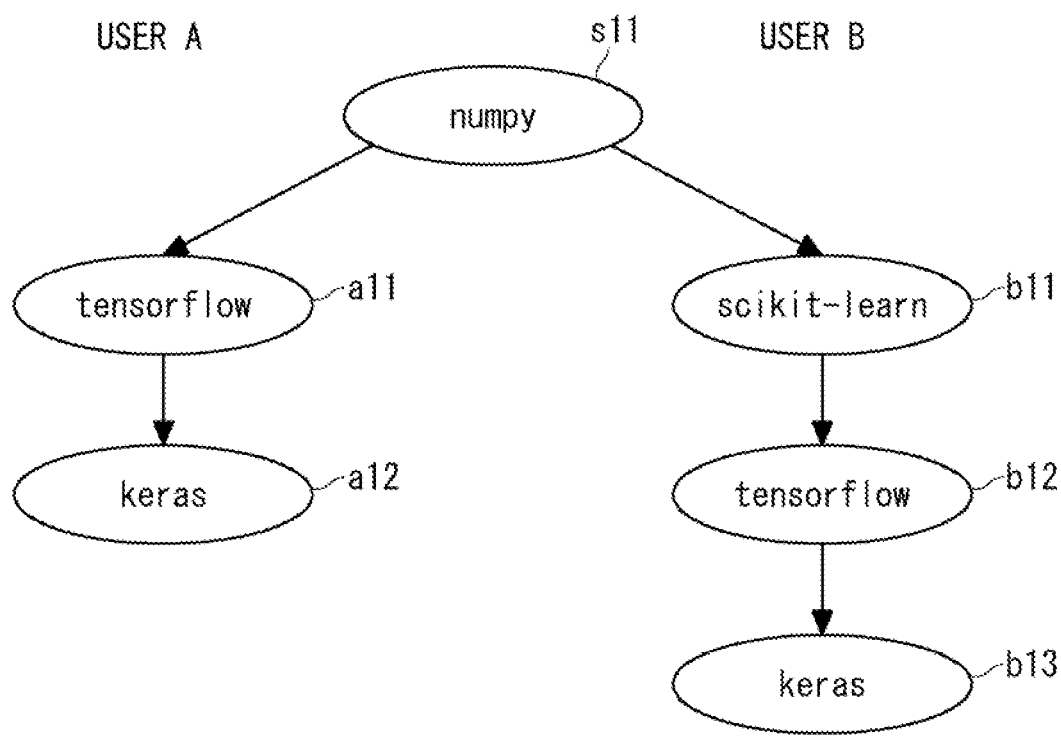
FIG. 24 is a diagram showing a tree of verification results etc. in the verification system according to the present disclosure.

As shown in FIG. 23, it is assumed that the user A has installed numpy, tensorflow, and keras (s11, a11, a12), and the user B has installed numpy, scikit-learn, tensorflow, and keras (s11, b11 to b13). In each step, operation verification is completed by the verification execution unit 40.

Assume now that the user A requests installation of scikit-learn (a13). When the verification execution unit 40 detects another branch that is different from a branch to which a package to be verified belongs only in the order of nodes, both from one root node, it uses a verification results of this another branch. In the example shown in FIG. 23, from numpy (s11) as a root node immediately before branching, a branch on the user A side to which the package to be verified (a13) belongs and a branch on the user B side are different only in the order of packages.

Thus, the verification execution unit 40 uses the verification result of the user B and permits the installation request of the user A without performing verification of scikit-learn (a13) for the user A. Therefore, a node is not added to the tree, and the tree is as shown in FIG. 24. Note that the verification execution unit 40 updates the testing environment 60 though not performing verification.

Although the case where a branch to which a requested package belongs and another branch are different only in the order from a root node immediately before branching is described in the above example, it is not limited thereto. For example, another node may be located between them, and there may be a different factor other than the order. Further, a specified criterion may be set to require a certain degree of similarity in the order.

As described above, according to the verification system 200 of this example embodiment, when there is a branch of verification results that is different only in the order from a root node in a tree of verification results, efficient verification is achieved by using this.

Sixth Example Embodiment

This example embodiment is described hereinafter with reference to FIG. 25. In this example embodiment, a method for enhancing the efficiency of verification on the basis of the proportion of packages common to another branch is described. Note that the configuration of the verification system 200 according to this example embodiment is the same as that of the second example embodiment and thus not repeatedly described below.

Figure 25:
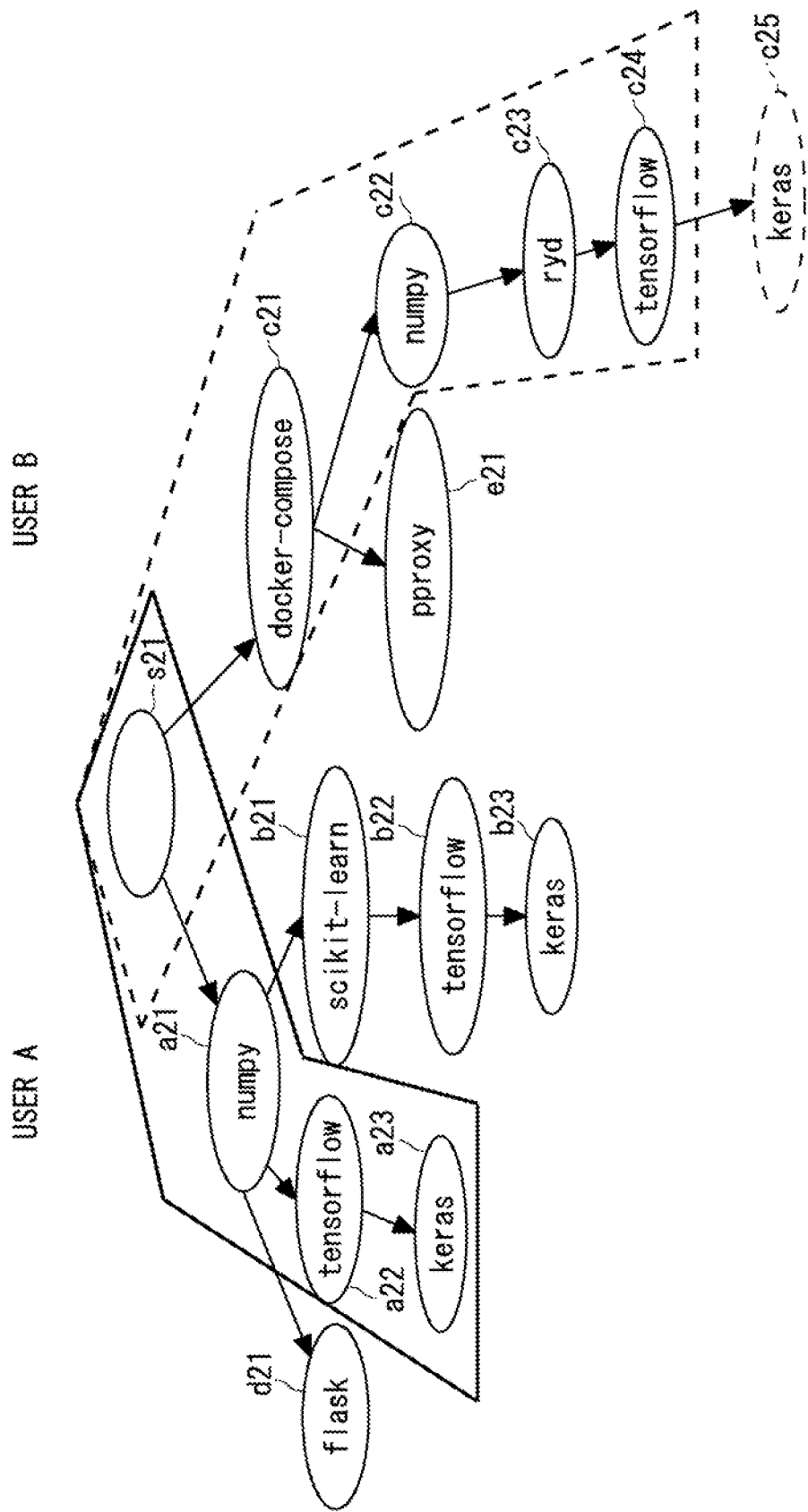
FIG. 25 is a diagram showing a tree of verification results etc. in the verification system according to the present disclosure.

In FIG. 25, it is assumed that the user A has installed numpy, tensorflow, and keras from the initial state (s21, a21 to a23). Further, it is also assumed that the user B has installed docker-compose, numpy, ryd, and tensorflow from the initial state (s21, c21 to c24).

Assume now that the user B requests installation for keras (c25). When the verification execution unit 40 detects another branch where packages common to a branch to which a package to be verified belongs are installed at a predetermined percentage or higher, both from one root node, it uses verification results of this another branch.

The predetermined percentage is 50%, for example.

In the example shown in FIG. 25, with the initial state (s21) as a root, three packages are installed in the branch of the user A, and four packages are installed in the branch of the user B. Comparing the installed packages of the user A and B, the two packages numpy (a21, c22) and tensorflow (a22, c24) are common.

The verification execution unit 40 calculates the proportion of those common packages to the installed packages of each user. In the above example, the proportion is two-thirds for the user A, and two-fourths for the user B. Thus, 50% or more packages are common between the branch of the user A and the branch of the user B. Therefore, the verification execution unit 40 does not perform verification of keras for the installation request from the user B, and permits installation of keras for the user B by using the verification result of the user A. Note that the verification execution unit 40 updates the testing environment 60 though not performing verification.

Although the predetermined percentage is 50% in the above example, it is not limited thereto. If the percentage is set higher, the installation environments of branches are closer, which enhances the verification accuracy. Further, this example embodiment may be combined with the fifth example embodiment, for example, and when the proportion of common packages is low, installation may be permitted only if the order is the same.

As described above, according to the verification system 200 of this example embodiment, when the proportion of packages common to another branch is a predetermined percentage or higher in a tree of verification results or the like, verification results of this another branch are used, which enables efficient verification.

Seventh Example Embodiment

In the fourth to sixths example embodiments, methods of efficiently using verified results are described. However, request patterns from users increase together with the number of published packages, and it is necessary to construct a new testing environment 60 when the existing verification results are not available. Keeping all of the constructed testing environments 60 causes a strain on the resources of a machine to perform verification.

In view of this, a method of efficiently managing the testing environments 60 constructed for verification is described in this example embodiment.

Figure 26:
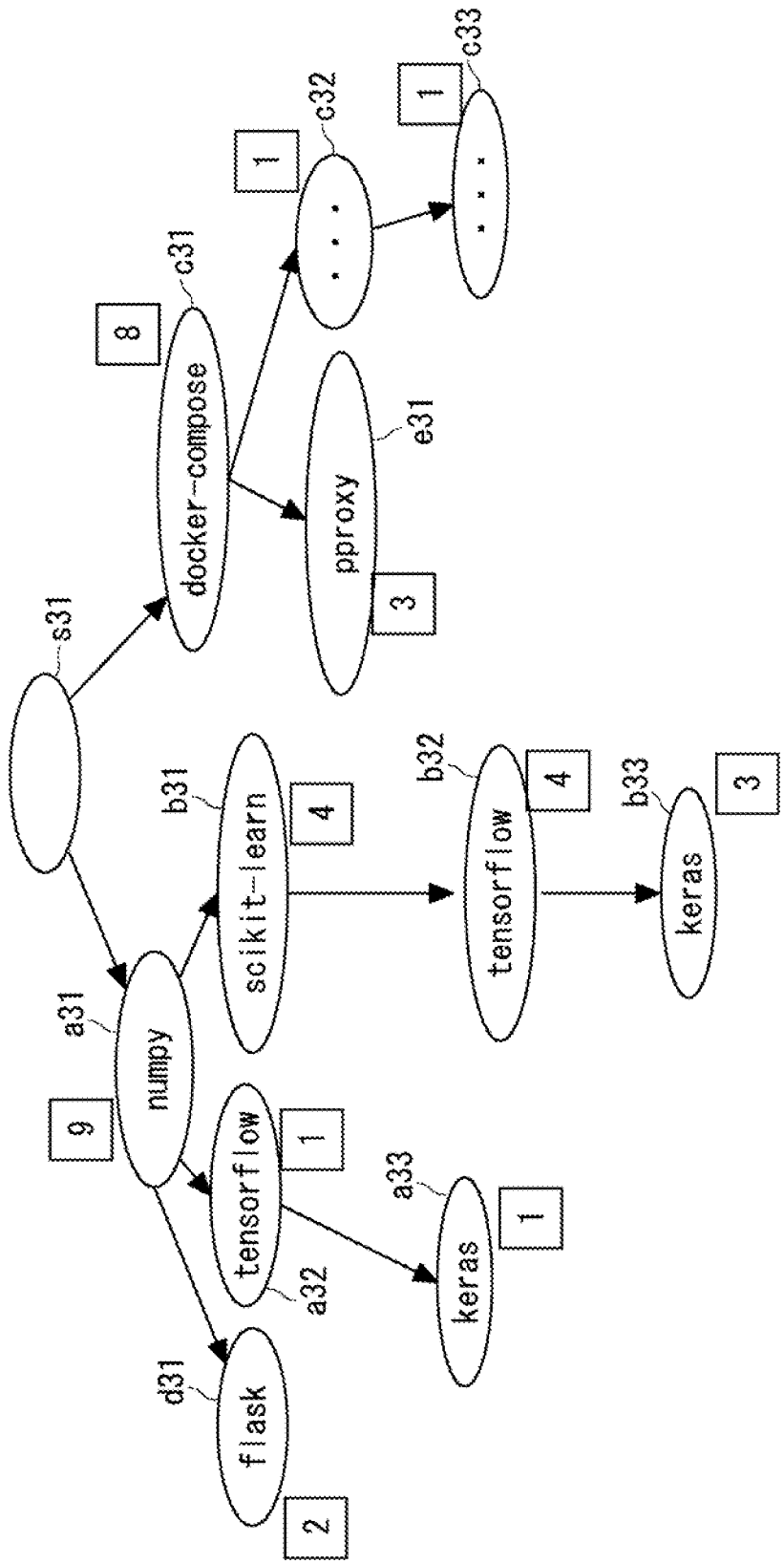
FIG. 26 is a diagram showing a tree of verification results etc. in the verification system according to the present disclosure.

In this example embodiment, the testing environments 60 are also managed using the tree structure described above. As shown in FIG. 26, in a tree of verification results, each node holds count information indicating the number of times a verification result is used.

To be specific, the verification execution unit 40 stores information indicating the number of times used into the result list 11, counting the first verification as the first time. Each time the verification result is used, the verification execution unit 40 increments the count by one and updates the result list 11. A field of frequency is added to the result list 11 as shown in FIG. 20, for example, so as to keep track of the number of times used. For example, after the first verification is done, the frequency is 2 if the verification result is used once, and it remains 1 if the verification result is not used. When the verification result is used, the verification execution unit 40 increments the count by one for all of the upper level nodes.

Figure 27:
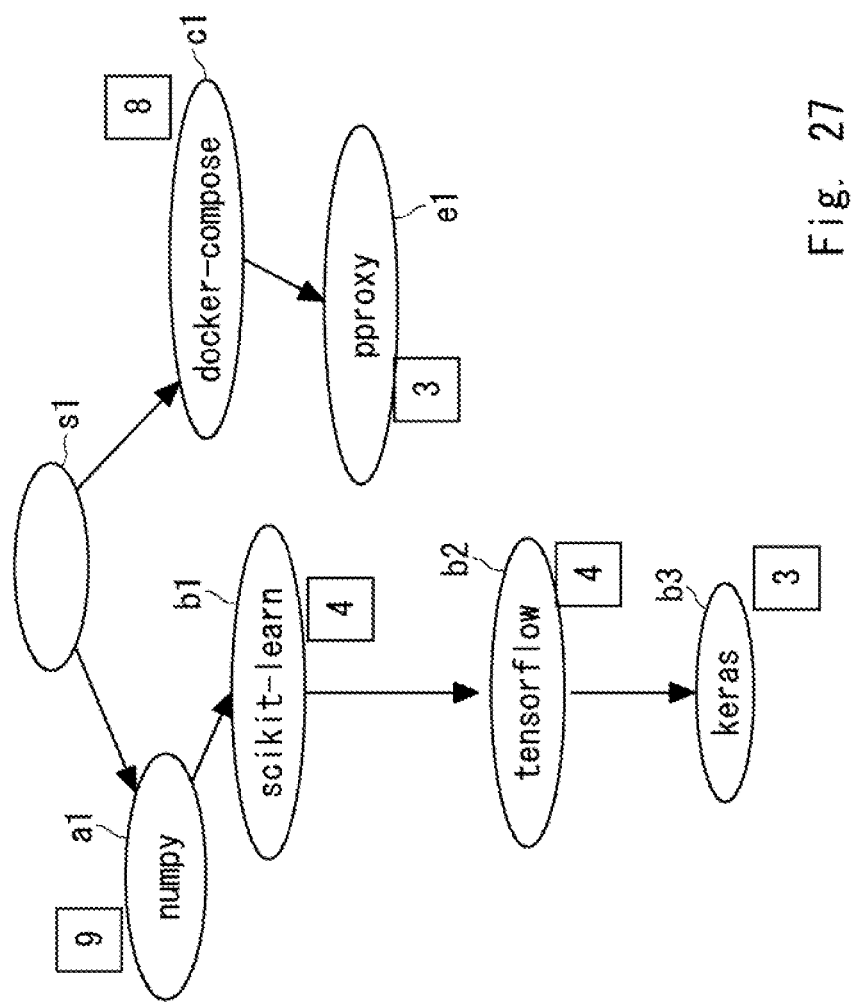
FIG. 27 is a diagram showing a tree of verification results etc. in the verification system according to the present disclosure.

On the basis of the above frequency, the verification execution unit 40 deletes the corresponding testing environment 60 at predetermined timing. The predetermined timing may be when the number of testing environments 60 reaches a predetermined upper limit, for example. The verification execution unit 40 deletes the testing environment 60 corresponding the verification result with the frequency of 2 or less, for example. FIG. 27 shows an example of the tree after deleting the testing environments 60. Note that only the testing environments 60 are deleted, and verification results and the count information are kept without being deleted. Thus, a verification result with low frequency can be possibly used in the future.

Figure 28:
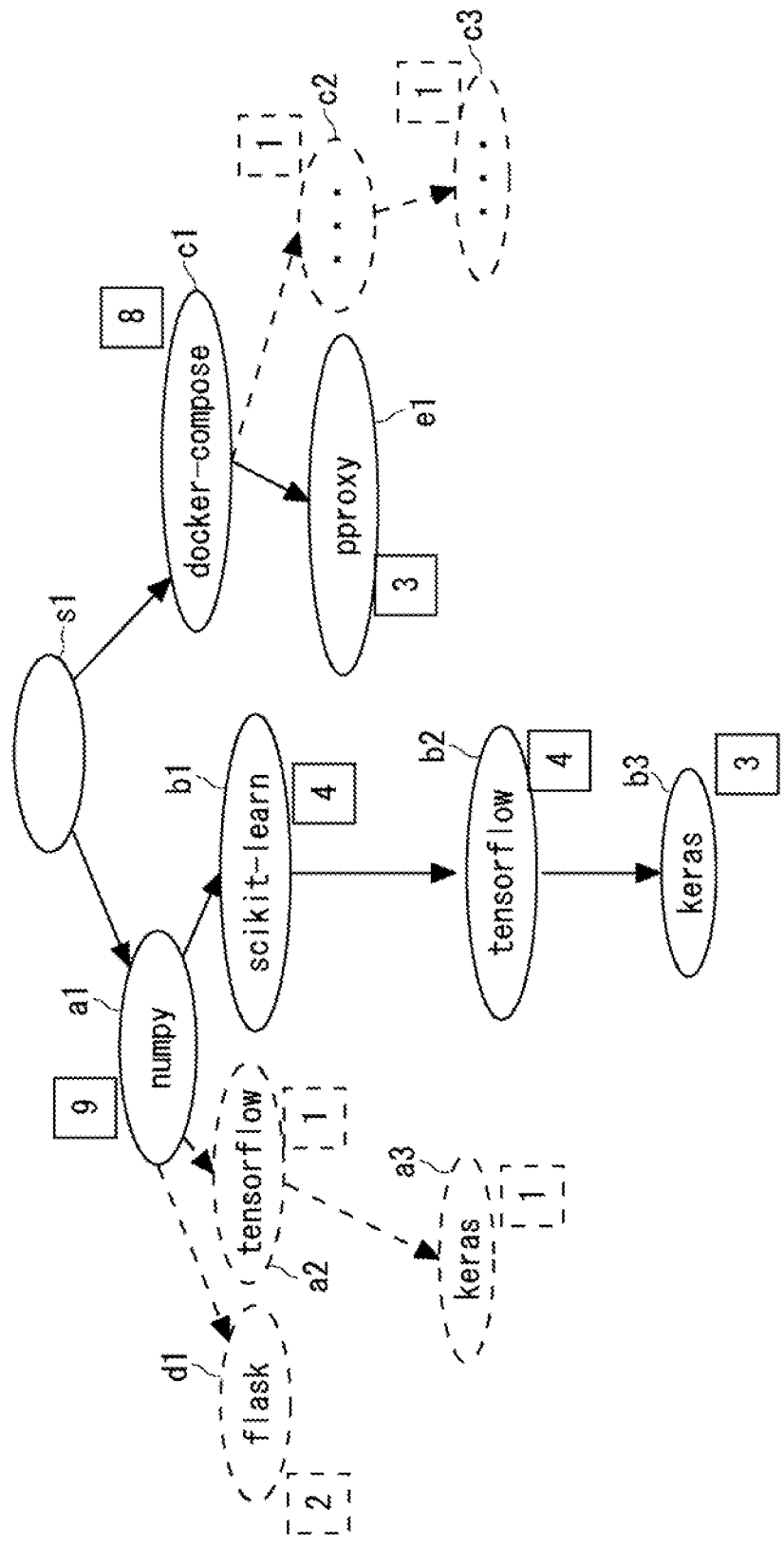
FIG. 28 is a diagram showing a tree of verification results etc. in the verification system according to the present disclosure.

Although nodes with low frequency are deleted in the example of FIG. 27, the tree may be updated in such a way that the fact of deletion is recognizable in the tree as shown in FIG. 28. This allows an administrator to grasp the situation in more detail.

As described above, according to the verification system 200 of this example embodiment, the testing environments 60 are managed efficiently.

<Hardware Configuration Example>

Figure 29:
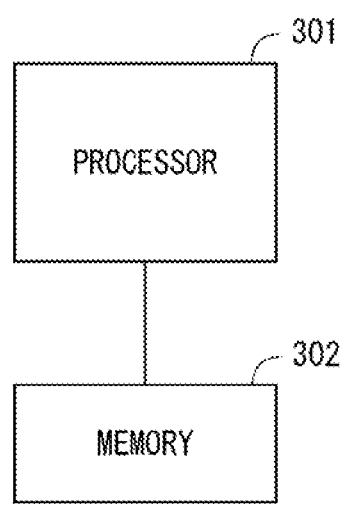
FIG. 29 is a diagram showing a hardware configuration example of the verification system according to the present disclosure.

FIG. 29 is a block diagram showing a hardware configuration example for implementing a verification process. This hardware configuration includes a processor 301 and a memory 302.

The processor 301 reads and executes a computer program (verification program) from the memory 302, and thereby performs the process of the verification device described with reference to the flowchart in the above example embodiment. The verification program causes a computer to execute a process of receiving, between a distribution server that distributes a distribution package for software development and a terminal device, an installation request for the distribution package transmitted from the terminal device, acquiring, from the distribution server, the distribution package requested by the received installation request, constructing a testing environment consistent with a development environment of the terminal device on the basis of the received installation request, performing installation verification of the acquired distribution package by using the constructed testing environment, and transmitting the acquired distribution package to the terminal device on the basis of a verification result of the installation verification.

The processor 301 may be a microprocessor, an MPU (Micro Processing Unit) or a CPU (Central Processing Unit), for example. The processor 301 may include a plurality of processors.

The memory 302 is a combination of a volatile memory and a nonvolatile memory. The memory 302 may include a storage that is placed apart from the processor 301. In this case, the processor 301 may access the memory 302 through an I/O interface, which is not shown.

In the example of FIG. 6, the memory 302 is used to store a group of software modules. The processor 301 performs the processing of the verification device 100 described in the above example embodiments by reading and executing the group of software modules from the memory 302.

Each processor runs one or a plurality of programs including a group of instructions for causing a computer to perform the algorithms described using the drawings. This program can be stored and provided to a computer using any type of non-transitory computer readable medium. Non-transitory computer readable media include any type of tangible storage medium. Examples of the non-transitory computer readable media include magnetic storage media (e.g., flexible disks, magnetic tapes, hard disk drives, etc.), optical magnetic storage media (e.g. magneto-optical disks), CD-ROM (Read Only Memory), CD-R, CD-R/W, semiconductor memories (e.g., mask ROM, PROM (Programmable ROM), EPROM (Erasable PROM), flash ROM, and RAM (Random Access Memory)). The program may be provided to a computer using any type of transitory computer readable medium. Examples of transitory computer readable media include electric signals, optical signals, and electromagnetic waves. The transitory computer readable medium can provide the program to a computer via a wired communication line such as an electric wire or an optical fiber, or a wireless communication line.

Note that the present disclosure is not limited to the above-described example embodiments and can be modified as appropriate without departing from the spirit and scope of the present disclosure.

For example, although the verification device 101 is used for each project in the above description, the present disclosure is not limited thereto. For example, information about a plurality of projects may be stored in one verification device 101 by identifying each project with a project ID.

Further, the tree structure of verification results or the like is not limited to the above example, and a tree may be separated on a package-by-package basis such as Python or Node.js, for example.

Further, although the testing environments 60 are deleted on the basis of the frequency of use of a verification result in the above example, the present disclosure is not limited thereto. For example, the similarity of environment information may be calculated, and the testing environments 60 with high similarity may be integrated to thereby delete unnecessary information.

Further, for example, the testing environments 60 may be deleted on the basis of date and time when a verification result or the like is used. To be specific, the verification execution unit 40 stores date and time when a verification result is used into the result list 11. The result list 11 may store a certain number of them as a history, or may be updated each time so that only the latest date and time used remain. For example, the verification execution unit 40 sets a predetermined period and deletes the testing environment 60 after this period has elapsed. For example, if the predetermined period is one year, the verification execution unit 40 deletes the testing environment 60 where one year has elapsed from the last time when the verification result was used.

The whole or part of the example embodiments disclosed above can be described as, but not limited to, the following supplementary notes.

(Supplementary Note 1)

A verification device comprising:
- a receiving means for receiving, between a distribution server that distributes a distribution package for software development and a terminal device, an installation request for the distribution package transmitted from the terminal device;
- an acquisition means for acquiring, from the distribution server, the distribution package requested by the received installation request;
- a construction means for constructing a testing environment consistent with a development environment of the terminal device on the basis of the received installation request;
- a verification means for performing installation verification of the acquired distribution package by using the constructed testing environment; and
- a transmitting means for transmitting the acquired distribution package to the terminal device on the basis of a verification result of the installation verification.

(Supplementary Note 2)

The verification device according to Supplementary note 1, wherein the receiving means receives the installation request from the terminal device, wherein the installation request requests acquisition of the distribution package to the distribution server.

(Supplementary Note 3)

The verification device according to Supplementary note 1, wherein the receiving means receives the installation request requesting acquisition of the distribution package to the verification device from the terminal device.

(Supplementary Note 4)

The verification device according to any one of Supplementary notes 1 to 3, comprising:
- a storage means for storing an environment list associating identification information of the terminal device and development environment information of the development environment, wherein
- the construction means identifies development environment information corresponding to identification information of the terminal device contained in the installation request on the basis of the environment list, and constructs the testing environment on the basis of the identified development environment information.

(Supplementary Note 5)

The verification device according to any one of Supplementary notes 1 to 3, comprising:
- a storage means for storing an environment list associating identification information of a user using the terminal device and development environment information of the development environment, wherein
- the construction means identifies development environment information corresponding to identification information of the user contained in the installation request on the basis of the environment list, and constructs the testing environment on the basis of the identified development environment information.

(Supplementary Note 6)

The verification device according to any one of Supplementary notes 1 to 3, comprising:
- a storage means for storing an environment list associating identification information of a development project using the terminal device and development environment information of the development environment, wherein
- the construction means identifies identification information development environment information of the development project contained in the installation request on the basis of the environment list, and constructs the testing environment on the basis of the identified development environment information.

(Supplementary Note 7)

The verification device according to any one of Supplementary notes 4 to 6, wherein the construction means acquires the development environment information from the terminal device, and registers the acquired development environment information into the environment list.

(Supplementary Note 8)

The verification device according to any one of Supplementary notes 4 to 6, wherein the construction means registers development environment information of a development environment provided to the terminal device into the environment list.

(Supplementary Note 9)

The verification device according to any one of Supplementary notes 4 to 8, wherein the construction means updates development environment information of the environment list on the basis of the verification result.

(Supplementary Note 10)

The verification device according to any one of Supplementary notes 1 to 9, comprising:
- a testing environment storing means for storing a testing environment used for the installation verification, wherein
- when a testing environment consistent with a development environment of the terminal device corresponds to the stored testing environment, the verification means performs the installation verification by using the corresponding testing environment.

(Supplementary Note 11)

The verification device according to Supplementary note 10, wherein
- the testing environment storing means stores a plurality of testing environments used for the installation verification in association with an installation history of the distribution package, and
- when a testing environment consistent with a development environment of the terminal device corresponds to any one of the plurality of associated testing environments, the verification means performs the installation verification by using the corresponding testing environment.

(Supplementary Note 12)

The verification device according to Supplementary note 11, wherein the testing environment storing means stores a plurality of testing environments used for the installation verification in association with a tree structure in order of installation of the distribution package, and when a testing environment consistent with a development environment of the terminal device corresponds to any one of the plurality of testing environments associated in the tree structure, the verification means performs the installation verification by using the corresponding testing environment.

(Supplementary Note 13)

The verification device according to Supplementary notes 11 or 12, wherein when a difference between an installation history of the distribution package in a testing environment consistent with a development environment of the terminal device and an installation history of the distribution package in the corresponding testing environment is within a predetermined range, the verification means performs the installation verification by using the corresponding testing environment.

(Supplementary Note 14)

The verification device according to Supplementary note 13, wherein when a difference between complexity of installation of the distribution package in a testing environment consistent with a development environment of the terminal device and complexity of installation of the distribution package in the corresponding testing environment is within a predetermined range, the verification means performs the installation verification by using the corresponding testing environment.

(Supplementary Note 15)

The verification device according to any one of Supplementary notes 10 to 14, wherein the testing environment storing means deletes the stored testing environment when predetermined conditions are met.

(Supplementary Note 16)

The verification device according to Supplementary note 15, wherein the testing environment storing means stores the testing environment and the number of times it is reused for the installation verification in association with each other, and deletes the stored testing environment on the basis of the number of times it is reused.

(Supplementary Note 17)

The verification device according to Supplementary notes 15 or 16, wherein the testing environment storing means stores the testing environment and time reused for the installation verification in association with each other, and deletes the stored testing environment on the basis of the time reused.

(Supplementary Note 18)

The verification device according to any one of Supplementary notes 1 to 17, comprising:

a verification result storing means for storing a verification result of the installation verification in association with a testing environment, wherein when a testing environment consistent with a development environment of the terminal device corresponds to the stored testing environment, the transmitting means transmits the distribution package on the basis of a verification result of the corresponding testing environment.

(Supplementary Note 19)

The verification device according to Supplementary note 18, wherein the verification result storing means stores, together with a verification result, a plurality of verification results used for the installation verification in association with an installation history of the distribution package, and when a testing environment consistent with a development environment of the terminal device corresponds to any one of the plurality of associated testing environments, the transmitting means transmits the distribution package on the basis of a verification result of the corresponding testing environment.

(Supplementary Note 20)

The verification device according to Supplementary note 19, wherein the verification result storing means stores, together with a verification result, a plurality of testing environments used for the installation verification in association with a tree structure in order of installation of the distribution package, and when a testing environment consistent with a development environment of the terminal device corresponds to any one of the plurality of testing environments associated in the tree structure, the transmitting means transmits the distribution package on the basis of a verification result of the corresponding testing environment.

(Supplementary Note 21)

The verification device according to Supplementary notes 19 or 20, wherein when a difference between an installation history of the distribution package in a testing environment consistent with a development environment of the terminal device and an installation history of the distribution package in the corresponding testing environment is within a predetermined range, the transmitting means transmits the distribution package on the basis of a verification result of the corresponding testing environment.

(Supplementary Note 22)

The verification device according to Supplementary note 21, wherein when a difference between complexity of installation of the distribution package in a testing environment consistent with a development environment of the terminal device and complexity of installation of the distribution package in the corresponding testing environment is within a predetermined range, the verification means transmits the distribution package on the basis of a verification result of the corresponding testing environment.

(Supplementary Note 23)

The verification device according to any one of Supplementary notes 1 to 22, wherein when the verification result is normal, the transmitting means transmits the acquired distribution package to the terminal device, and when the verification result is abnormal, the transmitting means transmits an error package indicating abnormality of the verification result or the like, instead of the distribution package, to the transmitting terminal.

(Supplementary Note 24)

The verification device according to Supplementary note 23, wherein the distribution package contains a specified script for executing installation, and the error package contains, as the specified script, a dummy script containing an instruction for outputting abnormality of the verification result or the like.

(Supplementary Note 25)

The verification device according to Supplementary note 24, wherein the dummy script contains one of information indicating details of abnormality of the verification result or the like and an instruction for outputting information of another distribution package related to a distribution package for which the verification result is abnormal.

(Supplementary Note 26)

A verification system comprising:
a distribution server that distributes a distribution package for software development, a terminal device to install the distribution package, and a verification device, wherein
the verification device comprises:
a receiving means for receiving, between the distribution server and the terminal device, an installation request for the distribution package transmitted from the terminal device;
an acquisition means for acquiring, from the distribution server, the distribution package requested by the received installation request;
a construction means for constructing a testing environment consistent with a development environment of the terminal device on the basis of the received installation request;
a verification means for performing installation verification of the acquired distribution package by using the constructed testing environment; and
a transmitting means for transmitting the acquired distribution package to the terminal device on the basis of a verification result of the installation verification.

(Supplementary Note 27)

A verification method comprising:
receiving, between a distribution server that distributes a distribution package for software development and a terminal device, an installation request for the distribution package transmitted from the terminal device;
acquiring, from the distribution server, the distribution package requested by the received installation request;
constructing a testing environment consistent with a development environment of the terminal device on the basis of the received installation request;
performing installation verification of the acquired distribution package by using the constructed testing environment; and
transmitting the acquired distribution package to the terminal device on the basis of a verification result of the installation verification.

(Supplementary Note 28)

A non-transitory computer readable medium causing a computer to execute a process comprising:
receiving, between a distribution server that distributes a distribution package for software development and a terminal device, an installation request for the distribution package transmitted from the terminal device;
acquiring, from the distribution server, the distribution package requested by the received installation request;
constructing a testing environment consistent with a development environment of the terminal device on the basis of the received installation request;
performing installation verification of the acquired distribution package by using the constructed testing environment; and
transmitting the acquired distribution package to the terminal device on the basis of a verification result of the installation verification.

REFERENCE SIGNS LIST

1 RECEIVING UNIT
2 ACQUISITION UNIT
3 CONSTRUCTION UNIT
4 VERIFICATION UNIT
5 TRANSMITTING UNIT
10 RESULT LIST STORAGE UNIT
11 RESULT LIST
20 USER LIST STORAGE UNIT
21 USER LIST
30 REQUEST PROCESSING UNIT
40 VERIFICATION EXECUTION UNIT
50 ENVIRONMENT LIST STORAGE UNIT
51 ENVIRONMENT LIST
55 PACKAGE GENERATION UNIT
56 PACKAGE STORAGE UNIT
60 TESTING ENVIRONMENT
61 TESTING ENVIRONMENT STORAGE UNIT
71 USER TERMINAL
72 ENVIRONMENT REGISTRATION UNIT
73 INSTALLATION EXECUTION UNIT
74 DISPLAY UNIT
90 NETWORK
91 DISTRIBUTION SERVER
100, 101 VERIFICATION DEVICE
200 VERIFICATION SYSTEM

What is claimed is:

1. A verification device comprising:
at least one memory storing instructions, and
at least one processor configured to execute the instructions to:
receive, between a distribution server that distributes a distribution package for software development and a terminal device, an installation request for the distribution package transmitted from the terminal device;
acquire, from the distribution server, the distribution package requested by the received installation request;
construct a first testing environment consistent with a development environment of the terminal device on the basis of the received installation request;
perform installation verification of the acquired distribution package by using the first testing environment; and
transmit the acquired distribution package to the terminal device on the basis of a verification result of the installation verification, wherein
the first testing environment used for the installation verification is stored in a testing environment storage,
when a second testing environment consistent with the development environment of the terminal device corresponds to the first testing environment, the at least one processor performs the installation verification by using the first testing environment,
a plurality of third testing environments used for the installation verification in association with an installation history of the distribution package also being stored in the testing environment storage,
when the second testing environment consistent with the development environment of the terminal device corresponds to any one of the plurality of third testing environments, the at least one processor performs the installation verification by using the corresponding any one of the plurality of third testing environments,
the plurality of third testing environments are used for the installation verification and are stored in association with a tree structure in order of installation of the distribution package in the testing environment storage,
such that when the second testing environment consistent with the development environment of the terminal device corresponds to the any one of the plurality of third testing environments associated in the tree structure, the at least one processor performs the installation verification by using the corresponding any one of the plurality of third testing environments, and such that when a difference between an installation history of the distribution package in the second testing environment consistent with the development environment of the terminal device and an installation history of the distribution package in the corresponding any one of the plurality of third testing environments is within a predetermined range in the tree structure, the at least one processor performs the installation verification by using the corresponding any one of the plurality of third testing environments.

2. The verification device according to claim 1, wherein the at least one processor is further configured to execute the instructions to receive the installation request from the terminal device, wherein the installation request requests acquisition of the distribution package to the distribution server.

3. The verification device according to claim 1, wherein the at least one processor is further configured to execute the instructions to receive the installation request requesting acquisition of the distribution package to the verification device from the terminal device.

4. The verification device according to claim 1, wherein an environment list associating identification information of the terminal device and development environment information of the development environment is stored in a storage, and
the at least one processor is further configured to execute the instructions to identify development environment information corresponding to identification information of the terminal device contained in the installation request on the basis of the environment list, and construct the first testing environment on the basis of the identified development environment information.

5. The verification device according to claim 4, wherein the at least one processor is further configured to execute the instructions to acquire the development environment information from the terminal device, and register the acquired development environment information into the environment list.

6. The verification device according to claim 4, wherein the at least one processor is further configured to execute the instructions to register development environment information of a development environment provided to the terminal device into the environment list.

7. The verification device according to claim 4, wherein the at least one processor is further configured to execute the instructions to update development environment information of the environment list on the basis of the verification result.

8. The verification device according to claim 1, wherein an environment list associating identification information of a user using the terminal device and development environment information of the development environment is stored in a storage, and
the at least one processor is further configured to execute the instructions to identify development environment information corresponding to identification information of the user contained in the installation request on the basis of the environment list, and construct the first testing environment on the basis of the identified development environment information.

9. The verification device according to claim 1, wherein an environment list associating identification information of a development project using the terminal device and development environment information of the development environment is stored in a storage, and
the at least one processor is further configured to execute the instructions to identify development environment information corresponding to identification information of the development project contained in the installation request on the basis of the environment list, and construct the first testing environment on the basis of the identified development environment information.

10. The verification device according to claim 1, wherein when a difference between complexity of installation of the distribution package in the second testing environment consistent with the development environment of the terminal device and complexity of installation of the distribution package in the first testing environment is within the predetermined range, the at least one processor is further configured to execute the instructions to perform the installation verification by using the first testing environment.

11. The verification device according to claim 1, wherein the first testing environment in the testing environment storage is deleted when predetermined conditions are met.

12. The verification device according to claim 11, wherein the first testing environment and a number of times the first testing environment is reused for the installation verification are stored in the testing environment storage in association with each other, and the first testing environment is deleted on the basis of the number of times it is reused.

13. The verification device according to claim 11, wherein the first testing environment and a time reused for the installation verification are stored in the testing environment storage in association with each other, and the first testing environment is deleted on the basis of the time reused.

14. The verification device according to claim 1, wherein a verification result of the installation verification is stored in a verification result storage in association with the first testing environment, and
when the second testing environment consistent with the development environment of the terminal device corresponds to the first testing environment, the at least one processor is further configured to execute the instructions to transmit the distribution package on the basis of a verification result of the first testing environment.

15. The verification device according to claim 14, wherein together with the verification result, a plurality of verification results used for the installation verification in association with the installation history of the distribution package are stored in the verification result storage, and
when the second testing environment consistent with the development environment of the terminal device corresponds to the any one of the plurality of third testing environments, the at least one processor is further configured to execute the instructions to transmit the distribution package on the basis of the verification result of the corresponding any one of the plurality of third testing environments.

16. The verification device according to claim 15, wherein together with the verification result, the plurality of third testing environments used for the installation verification in association with the tree structure in order of installation of the distribution package are stored in the verification result storage, and
when the second testing environment consistent with the development environment of the terminal device corresponds to the any one of the plurality of third testing environments associated in the tree structure, the at least one processor is further configured to execute the instructions to transmit the distribution package on the basis of the verification result of the corresponding any one of the plurality of third testing environments.

17. The verification device according to claim 15, wherein when the difference between the installation history of the distribution package in the second testing environment consistent with the development environment of the terminal device and the installation history of the distribution package in the corresponding any one of the plurality of third testing environments is within the predetermined range, the at least one processor is further configured to execute the instructions to transmit the distribution package on the basis of the verification result of the corresponding any one of the plurality of third testing environments.

18. The verification device according to claim 17, wherein when a difference between complexity of installation of the distribution package in the second testing environment consistent with the development environment of the terminal device and complexity of installation of the distribution package in the first testing environment is within the predetermined range, the at least one processor is further configured to execute the instructions to transmit the distribution package on the basis of the a verification result of the first testing environment.

19. The verification device according to claim 15, wherein when the verification result is normal, the at least one processor is further configured to execute the instructions to transmit the acquired distribution package to the terminal device, and when the verification result is abnormal, the at least one processor is further configured to execute the instructions to transmit an error package indicating abnormality of the verification result, instead of the distribution package, to the terminal device.

20. The verification device according to claim 19, wherein the distribution package contains a specified script for executing installation, and
the error package contains, as the specified script, a dummy script containing an instruction for outputting the abnormality of the verification result.

21. The verification device according to claim 20, wherein the dummy script contains one of information indicating details of the abnormality of the verification result and an instruction for outputting information of another distribution package related to a distribution package for which the verification result is abnormal.

22. The verification device according to claim 1, wherein when a branch indicated by the installation history of the distribution package in the second testing environment consistent with the development environment of the terminal device and a branch indicated by the installation history of the distribution package in the corresponding any one of the plurality of third testing environments in the tree are different only in order of installation of the distribution package, the at least one processor performs the installation verification by using the corresponding any one of the plurality of third testing environments.

23. The verification device according to claim 1, wherein the at least one processor identifies the distribution package that is common between a branch indicated by the installation history of the distribution package in the second testing environment consistent with the development environment of the terminal device and a branch indicated by the installation history of the distribution package in the corresponding any one of the third plurality of third testing environments in the tree, and performs the installation verification by using the corresponding any one of the third plurality of third testing environments when a proportion of the identified distribution package to each branch is a predetermined percentage or higher.

24. A verification system comprising:
a distribution server that distributes a distribution package for software development, a terminal device to install the distribution package, and a verification device, wherein
the verification device comprises:
at least one memory storing instructions, and
at least one processor configured to execute the instructions to;
receive, between the distribution server and the terminal device, an installation request for the distribution package transmitted from the terminal device;
acquire, from the distribution server, the distribution package requested by the received installation request;
construct a first testing environment consistent with a development environment of the terminal device on the basis of the received installation request;
perform installation verification of the acquired distribution package by using the first testing environment; and
transmit the acquired distribution package to the terminal device on the basis of a verification result of the installation verification, wherein
the first testing environment used for the installation verification is stored in a testing environment storage,
when a second testing environment consistent with the development environment of the terminal device corresponds to the first testing environment, the at least one processor performs the installation verification by using the first testing environment,
a plurality of third testing environments used for the installation verification in association with an installation history of the distribution package also being stored in the testing environment storage,
when the second testing environment consistent with the development environment of the terminal device corresponds to any one of the plurality of third testing environments, the at least one processor performs the installation verification by using the corresponding any one of the plurality of third testing environments,
the plurality of third testing environments are used for the installation verification and are stored in association with a tree structure in order of installation of the distribution package in the testing environment storage,
such that when the second testing environment consistent with the development environment of the terminal device corresponds to the any one of the plurality of third testing environments associated in the tree structure, the at least one processor performs the installation verification by using the corresponding any one of the plurality of third testing environments, and
such that when a difference between an installation history of the distribution package in the second testing environment consistent with the development environment of the terminal device and an installation history of the distribution package in the corresponding any one of the plurality of third testing environments is within a predetermined range in the tree structure, the at least one processor performs the installation verification by using the corresponding any one of the plurality of third testing environments.

25. A verification method performed by a computer and comprising:
receiving, between a distribution server that distributes a distribution package for software development and a terminal device, an installation request for the distribution package transmitted from the terminal device;

acquiring, from the distribution server, the distribution package requested by the received installation request;

constructing a first testing environment consistent with a development environment of the terminal device on the basis of the received installation request;

performing installation verification of the acquired distribution package by using the first testing environment; and transmitting the acquired distribution package to the terminal device on the basis of a verification result of the installation verification, wherein the first testing environment used for the installation verification is stored in a testing environment storage, when a second testing environment consistent with the development environment of the terminal device corresponds to the first testing environment, the computer performs the installation verification by using the first testing environment, a plurality of third testing environments used for the installation verification in association with an installation history of the distribution package also being stored in the testing environment storage, when the second testing environment consistent with the development environment of the terminal device corresponds to any one of the plurality of third testing environments, the computer performs the installation verification by using the corresponding any one of the plurality of third testing environments, the plurality of third testing environments are used for the installation verification and are stored in association with a tree structure in order of installation of the distribution package in the testing environment storage, such that when the second testing environment consistent with the development environment of the terminal device corresponds to the any one of the plurality of third testing environments associated in the tree structure, the computer performs the installation verification by using the corresponding any one of the plurality of third testing environments, and such that when a difference between an installation history of the distribution package in the second testing environment consistent with the development environment of the terminal device and an installation history of the distribution package in the corresponding any one of the plurality of third testing environments is within a predetermined range in the tree structure, the computer performs the installation verification by using the corresponding any one of the plurality of third testing environments.

26. A non-transitory computer readable medium storing instructions executable by a computer to perform a process comprising:

receiving, between a distribution server that distributes a distribution package for software development and a terminal device, an installation request for the distribution package transmitted from the terminal device;

acquiring, from the distribution server, the distribution package requested by the received installation request;

constructing a first testing environment consistent with a development environment of the terminal device on the basis of the received installation request;

performing installation verification of the acquired distribution package by using the first testing environment; and transmitting the acquired distribution package to the terminal device on the basis of a verification result of the installation verification, wherein the first testing environment used for the installation verification is stored in a testing environment storage, when a second testing environment consistent with the development environment of the terminal device corresponds to the first testing environment, the computer performs the installation verification by using the first testing environment, a plurality of third testing environments used for the installation verification in association with an installation history of the distribution package also being stored in the testing environment storage, when the second testing environment consistent with the development environment of the terminal device corresponds to any one of the plurality of third testing environments, the computer performs the installation verification by using the corresponding any one of the plurality of third testing environments, the plurality of third testing environments are used for the installation verification and are stored in association with a tree structure in order of installation of the distribution package in the testing environment storage, such that when the second testing environment consistent with the development environment of the terminal device corresponds to the any one of the plurality of third testing environments associated in the tree structure, the computer performs the installation verification by using the corresponding any one of the plurality of third testing environments, and such that when a difference between an installation history of the distribution package in the second testing environment consistent with the development environment of the terminal device and an installation history of the distribution package in the corresponding any one of the plurality of third testing environments is within a predetermined range in the tree structure, the computer performs the installation verification by using the corresponding any one of the plurality of third testing environments.

* * * * *